(12) United States Patent
Bursell et al.

(10) Patent No.: US 11,436,352 B2
(45) Date of Patent: Sep. 6, 2022

(54) PROOF-OF-WORK KEY WRAPPING FOR RESTRICTING DATA EXECUTION BASED ON DEVICE CAPABILITIES

(71) Applicant: Red Hat, Inc., Raleigh, NC (US)

(72) Inventors: Michael Hingston McLaughlin Bursell, Farnborough (GB); Nathaniel Philip McCallum, Raleigh, NC (US); Peter M. Jones, Boston, MA (US)

(73) Assignee: Red Hat, Inc., Raleigh, NC (US)

( * ) Notice: Subject to any disclaimer, the term of this patent is extended or adjusted under 35 U.S.C. 154(b) by 10 days.

(21) Appl. No.: 16/544,561

(22) Filed: Aug. 19, 2019

(65) Prior Publication Data

US 2021/0056214 A1  Feb. 25, 2021

(51) Int. Cl.
*H04L 29/06* (2006.01)
*G06F 21/62* (2013.01)
*H04L 9/14* (2006.01)
*H04L 9/08* (2006.01)

(52) U.S. Cl.
CPC .......... *G06F 21/62* (2013.01); *H04L 9/0861* (2013.01); *H04L 9/14* (2013.01)

(58) Field of Classification Search
CPC ....... H04L 63/0428; H04L 9/14; H04L 63/10; G06F 21/60; G06F 21/62
See application file for complete search history.

(56) References Cited

U.S. PATENT DOCUMENTS

| | | | |
|---|---|---|---|
| 7,496,662 B1 | 2/2009 | Roesch et al. | |
| 8,918,651 B2 | 12/2014 | Greco et al. | |
| 9,165,158 B2 | 10/2015 | Li et al. | |
| 9,454,648 B1 | 9/2016 | Philpott et al. | |
| 9,673,975 B1 | 6/2017 | Machani | |
| 9,735,962 B1 | 8/2017 | Yang | |
| 9,798,677 B2 | 10/2017 | Thom | |
| 9,935,772 B1* | 4/2018 | Madisetti | H04L 9/0819 |
| 10,063,372 B1 | 8/2018 | Chiu | |
| 10,454,674 B1 | 10/2019 | Bar-El et al. | |

(Continued)

FOREIGN PATENT DOCUMENTS

| | | |
|---|---|---|
| EP | 1075108 | 2/2001 |
| WO | 2018234922 | 12/2018 |

(Continued)

OTHER PUBLICATIONS

Clarkson, William. Time-Lock Cryptography. Dec. 15, 2013. pp. 1-12. Dec. 2013.*

(Continued)

*Primary Examiner* — Jason K Gee

(74) *Attorney, Agent, or Firm* — Lowenstein Sandler LLP

(57) ABSTRACT

The technology disclosed herein provides a proof-of-work key wrapping system for restricting data execution based on device capabilities. An example method may include: accessing a wrapped key and a cryptographic attribute for the wrapped key, wherein the wrapped key encodes a cryptographic key; deriving, by a processing device, the cryptographic key in view of the wrapped key and the cryptographic attribute; using the cryptographic key to access program data; and executing, by the processing device, the program data, wherein the executed program data evaluates a condition related to the duration of time.

18 Claims, 17 Drawing Sheets

(56) References Cited

U.S. PATENT DOCUMENTS

| | | |
|---|---|---|
| 10,491,576 B1 | 11/2019 | Pfannenschmidt et al. |
| 10,511,436 B1 | 12/2019 | Machani |
| 2002/0077988 A1* | 6/2002 | Sasaki ................ G06F 21/10 705/59 |
| 2005/0138374 A1 | 6/2005 | Zheng et al. |
| 2006/0059179 A1 | 3/2006 | Asano |
| 2008/0063197 A1 | 3/2008 | Jaquette et al. |
| 2008/0263363 A1 | 10/2008 | Jueneman et al. |
| 2009/0254750 A1 | 2/2009 | Bono |
| 2009/0254997 A1 | 10/2009 | Yassa |
| 2011/0176675 A1 | 7/2011 | Hughes et al. |
| 2012/0096262 A1* | 4/2012 | McDonald ........... H04L 9/0822 713/168 |
| 2012/0281840 A1 | 11/2012 | Rafsky et al. |
| 2013/0246813 A1 | 9/2013 | Mori et al. |
| 2016/0057114 A1 | 2/2016 | Unagami et al. |
| 2016/0127931 A1 | 5/2016 | Baxley et al. |
| 2016/0171224 A1 | 6/2016 | Taratine et al. |
| 2017/0093563 A1 | 3/2017 | Gazit et al. |
| 2017/0111331 A1 | 4/2017 | Auradkar et al. |
| 2017/0142081 A1 | 5/2017 | Jutla |
| 2017/0293899 A1 | 10/2017 | Furche et al. |
| 2018/0004930 A1 | 1/2018 | Csinger et al. |
| 2018/0062836 A1 | 3/2018 | Tanizawa |
| 2018/0115425 A1 | 4/2018 | Dechu et al. |
| 2018/0144340 A1 | 5/2018 | Kinnaird et al. |
| 2018/0218176 A1 | 8/2018 | Voorhees et al. |
| 2018/0268386 A1 | 9/2018 | Wack et al. |
| 2018/0270060 A1 | 9/2018 | Gray et al. |
| 2018/0365392 A1* | 12/2018 | Deschamps ............ G06F 21/10 |
| 2018/0367316 A1 | 12/2018 | Cheng et al. |
| 2019/0007198 A1 | 1/2019 | Neumann et al. |
| 2019/0245686 A1 | 8/2019 | Rahimi et al. |
| 2019/0296907 A1 | 9/2019 | Versteeg et al. |
| 2019/0297063 A1 | 9/2019 | De Gaspari et al. |
| 2019/0379646 A1 | 12/2019 | Mandal et al. |
| 2019/0394179 A1 | 12/2019 | Androulaki et al. |
| 2020/0112464 A1 | 4/2020 | Rogel et al. |
| 2020/0145199 A1 | 5/2020 | Kounavis et al. |
| 2020/0219097 A1 | 7/2020 | Chan et al. |
| 2020/0380149 A1 | 12/2020 | Ramesh |
| 2021/0056214 A1 | 2/2021 | Bursell et al. |
| 2021/0058238 A1 | 2/2021 | Bursell et al. |
| 2021/0058245 A1 | 2/2021 | Bursell et al. |
| 2021/0058247 A1 | 2/2021 | Bursell et al. |
| 2021/0058378 A1 | 2/2021 | Bursell et al. |
| 2021/0143986 A1 | 5/2021 | Gouget et al. |

FOREIGN PATENT DOCUMENTS

| | | |
|---|---|---|
| WO | 2019021105 | 1/2019 |
| WO | 2019034984 | 2/2019 |
| WO | 2020204444 | 10/2020 |

OTHER PUBLICATIONS

"Time-Lock Encryption", May 24, 2011, https://www.gwern.net/Self-decrypting-files, 21 pages.

Frankenfield, Jake, "Hashed Timelock Contract", Investopedia, Mar. 18, 2018, https://www.investopedia.com/terms/h/hashed-timelock-contract.asp, 6 pages.

Wang, Wenbo et al., "A Survey on Consensus Mechanisms and Mining Stratey Management in Blockchain Networks", Member; Senior Member; Fellow, IEEE, https://arxiv.org/pdf/1805.02707.pdf, 40 pages.

Liu,Jia et al., "How to Build Time-Lock Encryption", Institute for Communication Systems (ICS), 5G Innovation Centre (5GIC), Feb. 3, 2018, https://link.springer.com/article/10.1007/s10623-018-0461-x, 38 pages.

Odelberg, David et al., "Distributed Cipher Chaining for Increased Security in Password Storage", Department of Electrical Engineering, Linköpings Universite, 2014, http://liu.diva-portal.org/smash/get/diva2:724532/FULLTEXT01.pdf, 61 pages.

Nowicki et al., "Low-effort place recognition with WiFi fingerprints using deep learning", Springer, vol. 1, pp. 3-7, Apr. 28, 2017, 10 pages.

* cited by examiner

PROOF-OF-WORK KEY WRAPPING FOR RESTRICTING DATA EXECUTION BASED ON DEVICE CAPABILITIES

TECHNICAL FIELD

The present disclosure generally relates to a cryptographic system for controlling access to data, and is more specifically related to a proof-of-work key wrapping mechanism that encrypts a cryptographic key to restrict access to the data.

BACKGROUND

Computers often use cryptographic techniques to restrict access to content. The cryptographic techniques may involve generating a secret key that is used by a device to access the content. The secret key may be something as simple as a passcode or something more complex, such as a cryptographic token. The device may use the secret key as input to a locking mechanism to gain access to the content. The locking mechanism may involve a cryptographic function and the device may use the secret key as input when executing the cryptographic function. If the secret key is correct, the cryptographic function will enable access to the content and if the secret key is incorrect, the cryptographic function will not enable access to the content. In a simple example, the secret key may be used with the cryptographic function to encrypt content and may be subsequently used to decrypt the content to enable a device to access the content. The secret key may be transmitted between computing devices and before transmission the secret key may be encrypted to avoid the secret key from being compromised during transmission. The process of encrypting the secret key may be referred to as key wrapping and the resulting encrypted secret key may be referred to as a wrapped key.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
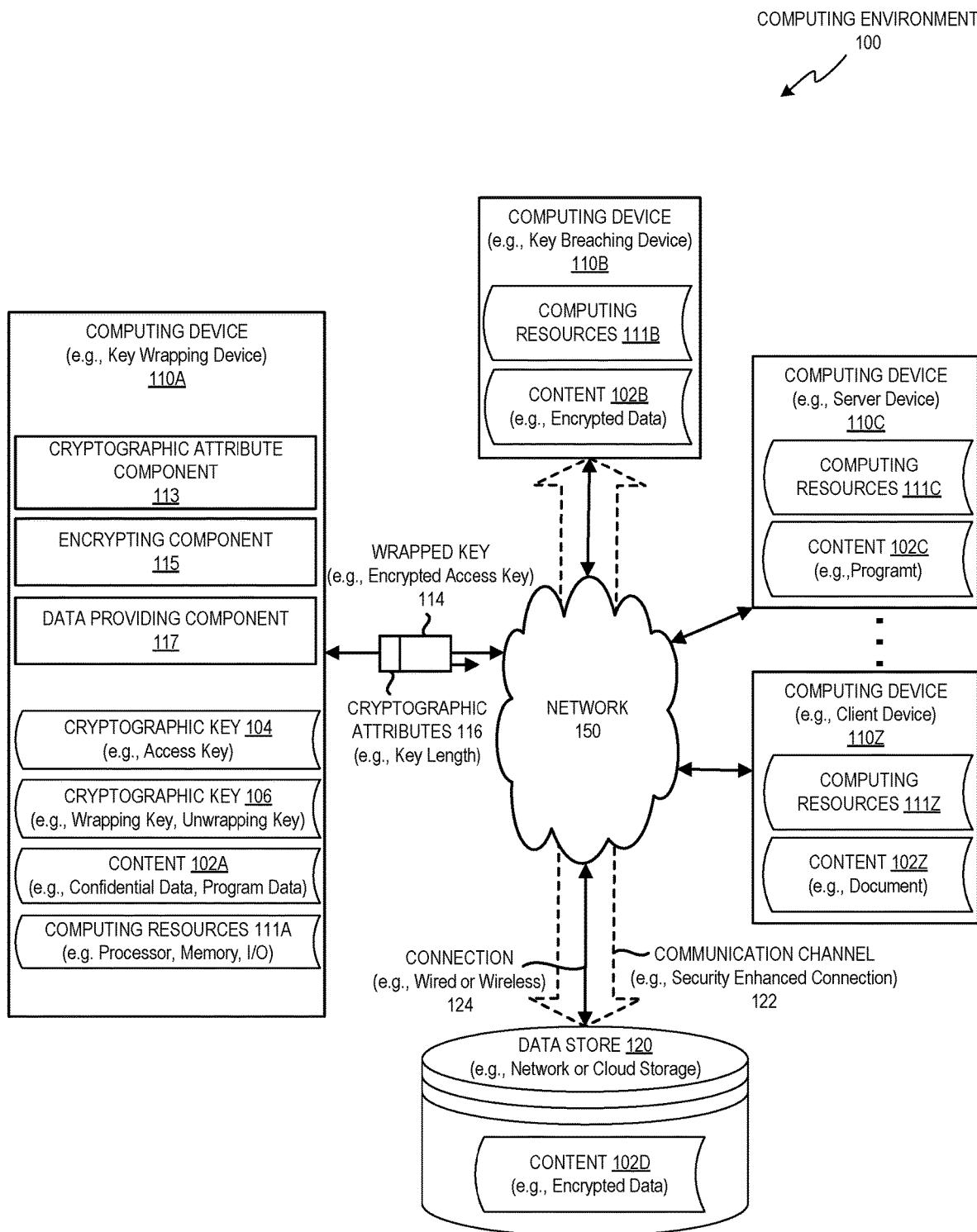
FIG. 1 depicts a high-level block diagram of an example computing environment that uses a proof-of-work key wrapping system, in accordance with one or more aspects of the present disclosure.

Modern computer systems restrict access to content using cryptographic techniques and enable access to the content by providing devices with a key. The access is traditionally provided at a binary level and the device has access to the content if the device has the key and is prohibited access if the device does not have the key. Restricting access based on possession alone is often insufficient for a more sophisticated access control mechanism that may involve controlling a device's ability to access the content based on time, available computing resources, other attribute, or a combination thereof.

Proof-of-work systems may supplement an access control mechanism and often function as a computational puzzle that is solved by a computer that intends to perform a restricted action. The computer may solve the computational puzzle and send the results to another device. The other device checks the results and, if the results are correct, may enable the action to be fulfilled. The other device is often a trusted third party computer that is separate from the computer solving the puzzle. The separation helps ensure that the data for checking the results is not exploited to make solving the computational puzzle easier. Requiring a separate device for checking the results makes the system more complex and/or vulnerable.

Aspects of the present disclosure address the above and other deficiencies by providing technology that integrates a cryptographic key wrapping system with proof-of-work features to enhance an access control mechanism. In one example, the technology may receive a cryptographic key for accessing content and may encrypt the cryptographic key to produce a wrapped key. The wrapped key may be provided to a recipient computing device without an unwrapping key and the content of the cryptographic key may remain hidden until the recipient computing device can derive a key to unwrap the wrapped key. The manner in which the cryptographic key is wrapped (e.g., strength of encryption) and any hints for breaching the wrapped key may be selected so that the process of deriving the cryptographic key from the wrapped key functions as proof-of-work task (e.g., a computational puzzle). The proof-of-work task can be configured so that it will consume a particular amount of computing resources (e.g., processor cycles, memory operations). The result of the proof-of-work task may be an unwrap key that can be used to expose the cryptographic key and may enable access to content without relying on another device to verify the proof-of-work results.

The manner in which the cryptographic key is wrapped and any hints for deriving the cryptographic key (e.g., breaching the wrapped key) may be based on one or more cryptographic attributes. The cryptographic attributes may be selected to cause the recipient computing device to consume a quantity of a particular computing resource (e.g., processor, memory, disk, network) or take a particular amount of time to derive the cryptographic key from the wrapped key (e.g., complete the proof-of-work task). The cryptographic attributes may be selected by the device wrapping the cryptographic key or by a management device that provides the cryptographic attributes to the device wrapping the cryptographic key. The cryptographic attributes may be selected based on the computing resources of a recipient computing device. The recipient computing device may be unknown at the time of wrapping the key and the selection may be based on an approximation of computing resources of intended recipient computing devices. The cryptographic attributes may correspond to attributes for generating keys, wrapping keys, breaching keys, other operation, or a combination thereof. In one example, the cryptographic attributes may correspond to one or more key lengths, cryptographic functions, salt values, other attribute, or a combination thereof.

The systems and methods described herein include technology that enhances an access control system by incorporating a proof-of-work key wrapping scheme. In particular, aspects of the present disclosure may integrate a proof-of-work system with key wrapping to avoid relying on a third party service to verify whether the proof-of-work was completed. The verification may be configured to be inherent because when the results of the proof-of-work are incorrect the resulting key will not work and access will be prohibited. In another aspect, the settings for the proof-of-work (e.g., cryptographic attributes) may be selected to be specific to a class of recipient computing devices but may be independent from the content being protected or the particular bit sequence of the cryptographic key. Therefore, the settings for the proof-of-work can be selected before the content or cryptographic key is chosen, created, or modified. For example, in an encryption scenario the proof-of-work settings for wrapping a cryptographic key may be selected before, during, or after, the cryptographic key is generated or the content is encrypted. In addition, approximating the computing resources that will be consumed does not depend on the size, complexity, or location of the content that is being restricted. The technology discussed herein may be applied in a variety of use cases and each use case may include additional or alternate advantages. For example, the technology may be used to verify capabilities of a recipient computing device, to delay access of a recipient computing device, other use, or a combination thereof.

Using the technology to verify the capabilities of a recipient computing device may involve configuring the proof-of-work key wrapping to target particular characteristics of the recipient computing device. The characteristics may relate to any computing resource of the recipient computing device and may include one or more aspects of processing devices (e.g., operations per second), memory devices (e.g., memory space), storage devices (e.g., read/write speed), network devices (e.g., bandwidth), other devices, or a combination thereof. As discussed above, the selection of the cryptographic attributes may cause the process of breaching the wrapped key to consume a particular quantity of computing resources. By further incorporating a time determination feature, the technology may determine how long the breaching takes and therefore calculate a rate of the computing resources (e.g., rate=quantity/time). The rate of the computing resources may be used to quantify the performance of the computing resources and may be compared to one or more predetermined threshold values to detect whether the recipient computing device satisfies a threshold (e.g., threshold value). The threshold may be based on a value advertised by a provider of computing resources or a value requested by a consumer of the computing resources. The proof-of-work wrapping may be used to verify the capabilities of any computing device and may correspond to a cloud computing device (e.g., host machine, virtual machine, container), a distributed computing device (e.g., edge computing node), an end user device (e.g., smart phone, laptop), internet of things device (e.g., smart speaker), other computing device, or a combination thereof. Using a proof-of-work key wrapping to qualify computing resources is discussed in more detail in regards to FIG. 6.

The technology may also or alternatively be used to provide a cryptographically enforced delay for accessing protected content (e.g., data of a document or program). As discussed above, the technology may select cryptographic attributes for the proof-of-work key wrapping that will control the quantity of computing resources consumed by a recipient computing device. The technology can also approximate the rate of performance of the computing resources based on characteristics of the device and therefore determine time for solving the proof-of-work key wrapping (e.g., time=quantity/rate). The time may correspond to an approximate delay incurred by the recipient computing device to derive a cryptographic key from the wrapped key. The cryptographic key may then be used to access content. In one example, proof-of-work key wrapping may be used to wrap an encryption key that is used to access encrypted content. In another example, proof-of-work key wrapping may be used to wrap a session key, an authentication key, a verification key, other data, or a combination thereof. In any of the examples, the proof-of-work key wrapping may cryptographically impose a delay in accessing data and is discussed in more detail in regards to FIG. 7.

Approximating the amount of computing resources or time consumed to derive the cryptographic key from a wrapped key may be a statistical operation that results in a statistical approximation. The statistical approximation may be an expected value that corresponds to an average consumption and the actual amount of computing resources consumed for a particular instance may vary between a best case scenario and worst case scenario. For example, deriving the cryptographic key from the wrapped key may involve an exhaustive key search to identify the unwrapping key (e.g., brute force attack). The best case scenario may occur when the first candidate key is the unwrapping key and the worst case scenario may occur when the last candidate key is the unwrapping key. To smooth out the statistical variations, the technology may use more keys. The increase in the number of keys will increase the probability that the actual results will be closer to the expected average value and farther from the best and worst case scenarios.

The technology may increase the number of keys in multiple ways. In one example, the technology may split the cryptographic key into multiple keys (e.g., key fragments) that are each individually wrapped. The resulting wrapped keys (e.g., wrapped key fragments) may be provided to a recipient computing device with cryptographic attributes (e.g., hints for breaching each wrapped key) and the recipient computing device may derive the unwrapping key for each of the wrapped keys. In another example, the technology may split the unwrapping key instead of or in addition to splitting the cryptographic key being wrapped. The unwrapping key may be replaced with a set of unwrapping keys. In this situation, a single wrapped key may be provided to the recipient computing device along with cryptographic attributes for each unwrapping key in the set (e.g., hints for each unwrap key fragment). The cryptographic attributes may enable the recipient computing device to derive each of the multiple unwrapping keys and the multiple unwrapping keys may be combined and used to unwrap the wrapped key. Smoothing the statistic variations using multiple unwrapping keys is discussed in more detail in regards to FIGS. 4, 5A, and 5B.

The cryptographic key or unwrapping key discussed above may be a set of keys and multiple keys of the set may be combined to enable access to the restricted content. The keys in the set may be the same or similar to key fragments, key shares, key segments, key parts, other term, or a combination thereof. Two or more of the keys in the set may be combined and provided as a single input or as separate inputs to a cryptographic function. In one example, all of the keys in a set may be used together and if one or more of the keys in the set are unknown to the recipient computing device the recipient computing device may be unable to access the content. In another example, a subset of the keys in the set may be used together even though one or more keys in the set are unknown. In the latter example, the minimum quantity of keys in the subset may need to satisfy a threshold number before access is enabled (e.g., key thresholding). For example, a set may include seven keys (n=7) and the threshold may be configured to be the integer value three (t=3) and if the subset has at least three of the seven keys, the content may be accessible (e.g., t of n).

Various aspects of the above referenced methods and systems are described in details herein below by way of examples, rather than by way of limitation. The examples provided below discuss a computing environment where a computing device is provided access via a proof-of-work key wrapping mechanism that may be configured before, during, or after the recipient computing devices or content are identified.

FIG. 1 illustrates an exemplary computing environment 100 in which implementations of the disclosure may operate. Computing environment 100 may include one or more computing devices at a single physical location (e.g., data center) or across multiple physical locations (e.g., different data centers). In one example, computing environment 100 may include content 102A-Z, a cryptographic key 104, one or more computing devices 110A-Z, and a network 150.

Content 102A-Z may be any intangible or tangible content that a computing device or user can be restricted from accessing using the technology disclosed herein. Intangible content may be digital content that cannot be touched by a human and may include data in one or more messages (e.g., packets, data frames, analog or digital signals), data storage objects (e.g., computer files, database records, arrays), other digital or analog resources, or a combination thereof. Tangible content may include resources that can be touched by a human and may include computer hardware, physical credentials (e.g., ID badges, licenses), paper documents, currency, other physical objects, or a combination thereof.

Cryptographic keys 104 and 106 may be any pieces of information that can be used to protect or enable a computing device to access a portion of content 102A-Z. Cryptographic keys 104, 106 may exist in a human readable form (e.g., passcode, password), a non-human readable form (e.g., digital token or digital certificate), other form, or a combination thereof. Cryptographic keys 104, 106 may be input to a cryptographic function, output of a cryptographic function, or a combination thereof. As shown in FIG. 1, cryptographic key 104 may be an access key that enables a computing device or user to access content and cryptographic key 106 may be used as a key for wrapping or unwrapping cryptographic key 104. Cryptographic keys 104, 106 may be or include one or more encryption keys, wrap keys, decryption keys, session keys, transport keys, migration keys, authentication keys, authorization keys, digital certificates, integrity keys, verification keys, digital tokens, license keys, signatures, hashes, other data or data structure, or a combination thereof.

Cryptographic keys 104, 106 and any number of other cryptographic keys may be used as part of a cryptographic system that provides privacy, integrity, authentication, authorization, non-repudiation, other features, or a combination thereof. Computing environment 100 may use a combination of multiple different cryptographic systems to implement the proof-of-work key wrapping. For example, one or more of the computing devices 110A-Z may use an asymmetric cryptographic system to perform an exchange of cryptographic key 104, cryptographic key 106, wrapped key 114, cryptographic attributes 116, other data, or a combination there of. The exchanged data may then be used to enable one or more of the recipient computing devices 110B-Z to derive cryptographic key 104 from wrapped key 114 in order to access or provide access to content 102A-Z. Example cryptographic systems are discussed in more detail in regards to encrypting component 115 of FIG. 2.

Computing devices 110A-Z may include one or more server devices (e.g., standalone servers or rack mounted servers), personal computers (e.g., desktops, workstations, laptops), mobile devices (e.g., phones, tablets, watches, key fobs, key cards), embedded systems (e.g., safes, door locks, automation devices), other electrical or electromechanical device, or a combination thereof. Computing devices 110A-Z may be able to create, transmit, receive, or use one or more cryptographic keys to protect or access content. Computing device 110A may wrap cryptographic key 104 and computing devices 110B-D may unwrap and subsequently use cryptographic key 104 to access content. Each of the computing devices 110A-Z may include respective Computing resources 111A-Z.

Computing resources 111A-Z may include one or more physical computing resources, virtual computing resources, or a combination thereof that can be used to perform a computing task (e.g, proof-of-work task). Computing resources 111A-Z may include hardware resources, program resources, other resources, or a combination thereof. The hardware resources may include processor resources (e.g., processor speed, process architecture, number of CPU/GPU cores), storage resources (e.g., disk space, memory size), input/output (I/O) (e.g., networking I/O, processor I/O, memory I/O), other resources, or a combination thereof. The program resources may correspond to features of an application, operating system, hypervisor, kernel, other computing program, or a combination thereof. Computing resources 111A-Z may be determined (e.g., approximated, estimated, predicted) by computing device 110A and stored as characteristic data, which is discussed in more detail in regards to FIG. 2.

Computing device 110A may function as a device for managing the key wrapping and may select the settings used to configure the proof-of-work key wrapping. In the example shown in FIG. 1, computing device 110A may select the cryptographic attributes and also wrap cryptographic key 104 in view of the selected cryptographic attributes. In other examples, computing device 110A may select cryptographic attributes 116 but one or more other devices may create the cryptographic key, wrap the cryptographic key, or a combination thereof. As shown in FIG. 1, computing device 110A may include a cryptographic attribute component 113, an encrypting component 115, and a data providing component 117. Cryptographic attribute component 113 may estimate the characteristics of a recipient computing device (e.g., one of computing devices 110B-D) and select at least one cryptographic attribute based on the characteristic of the recipient computing device. Encrypting component 115 may access the selected cryptographic attributes and wrap the cryptographic key 104 based on the selected cryptographic attribute. Data providing component 117 may provide the wrapped key 114 and details about one or more of the selected cryptographic attributes 116 to one of the computing devices 110B-Z (e.g., recipient computing devices).

Computing devices 110B-Z may be alternate examples of computing devices that perform the proof-of-work key wrapping tasks (e.g., key breaching) to derive cryptographic key 104 from wrapped key 114 without being provided the unwrapping key. Computing devices 110B-Z may be client devices or server devices and may be referred to as recipient computing devices because they may be the recipient of a wrapped version of cryptographic key 104 (e.g., wrapped key 114) and a cryptographic attribute 116 (e.g., breaching hint). Computing devices 110B-Z may also or alternatively be referred to as accessing devices because after deriving cryptographic key 104 from wrapped key 114 they may use cryptographic key 104 to access content 102A-Z. Computing devices 110B-Z may access content that is stored in local data storage (e.g., integrated or directly attached storage), remote storage (e.g., accessible over a network), other storage, or a combination thereof. For example, computing device 110C may use the unwrapped cryptographic key 104 to access content 102C that is stored locally, content 102Z on computing device 110Z, or content 102C stored remotely on data store 120.

Computing device 110B may access content by using the unwrapped cryptographic key 104 to establish a communication channel 122 with a device that contains the content (e.g., data of document or program). Communication channel 122 may be initiated or established by computing device 110B, data store 120, another computing device, or a combination thereof. Communication channel 122 may involve one or more connections 124 that communicably couple computing device 110B with one or more other devices (e.g., data store 120 or computing device 110Z). Connection 124 may include one or more wired connections, wireless connections, or a combination thereof. Communication channel 122 may be associated with cryptographic key 104 and cryptographic key 104 may have been used to establish communication channel and/or to enhance one or more security features of a communication channel. The security features may enhance privacy, integrity, authentication, authorization, non-repudiation, other feature, or a combination thereof. Communication channel 122 may be a security enhanced connection that occurs at one or more levels of a networking stack and may be the same or similar to a connection based on a Transport Layer Security (TLS), Internet Protocol Security (IPSec), Virtual Private Network (VPN), Hyper Text Transfer Protocol Secure (HTTPS), other connection technology or protocol, or a combination thereof.

Communication channel 122 may be a network connection, a computer-to-computer connection, other connection, or a combination thereof. The network connection may be an indirect connection that traverses one or more network nodes (e.g., access points, switches, routers, or other networking infrastructure device) that communicably couple computing device 110A with one or more of computing devices 110B-Z. A computer-to-computer connection may be the same or similar to a peer-to-peer connection and may be a direct connection between computing device 110B and data store 120 or one of the computing device 110C-D (e.g., bluetooth connection, ad-hoc network connection). In one example, cryptographic key 104 may be a session key that is used to decrypt and/or encrypt data of content 102D. Content 102D may include data this is stored in an encrypted or non-encrypted form when on a remote device (e.g., data store 120) and may be transmitted over communication channel 122 in an encrypted form (e.g., doubly encrypted form). Computing device 110B may then receive the encrypted content and decrypt it using cryptographic key 104.

Computing device 110C may include or be coupled to a data storage device that stores content 102C. Content 102C may include one or more encrypted data storage objects, which may include file objects (e.g., encrypted files), database objects (e.g., databases, records, field values), other storage objects, or a combination thereof. Computing device 110C may provide computing device 110B with access to content 102C by transmitting data of content 102C (e.g., encrypted content) over an encrypted or non-encrypted communication channel. Computing device 110B may receive the data and decrypt the data using cryptographic key 104.

One or more of computing devices 110A-Z may be or include an embedded control system that provides or restricts physical access or virtualized access to the content. In one example, the recipient computing device may provide physical access to an access restricted region (e.g., lockable region). The access may restrict the ability to enter, leave, add, or remove something or someone from the restricted region. The restricted region may be partially or fully enclosed and may include one or more points of access that may be restricted (e.g., restricted entry points). Example restricted regions may include computer enclosures (e.g., computer cases, rack units, server cabinets), boxes (e.g., safes, lock boxes), rooms (e.g., server rooms, file rooms), buildings (e.g., data centers), other regions, or a combination thereof. The content being restricted may be any tangible resource associated with the recipient computing device and may include computer hardware (e.g., adapters, ports, connection points), physical credentials (e.g., ID badge, passport, license), paper documents, currency, other physical objects, or a combination thereof. In another example, the recipient computing device may be a lock box (e.g., safe) and the content may be a tangible object in the lock box. The lock box may provide restricted access and a user may use another computing device (e.g., a mobile phone) to access the lock box using the unwrapped cryptographic key 104. The embedded control system of the lock box may receive and verify cryptographic key 104 using a cryptographic function. In response to the verification being satisfied, the recipient computing device may unlock the restricted access point (e.g., lock box door) and the user may retrieve the tangible object.

Network 150 may be a public network (e.g., the internet), a private network (e.g., a local area network (LAN) or wide area network (WAN)), or a combination thereof. In one example, network 150 may include a wired or a wireless infrastructure, which may be provided by one or more wireless communications systems, such as a wireless fidelity (WiFi) hotspot connected with the network 150 and/or a wireless carrier system that can be implemented using various data processing equipment, communication towers, etc.

Figure 2:
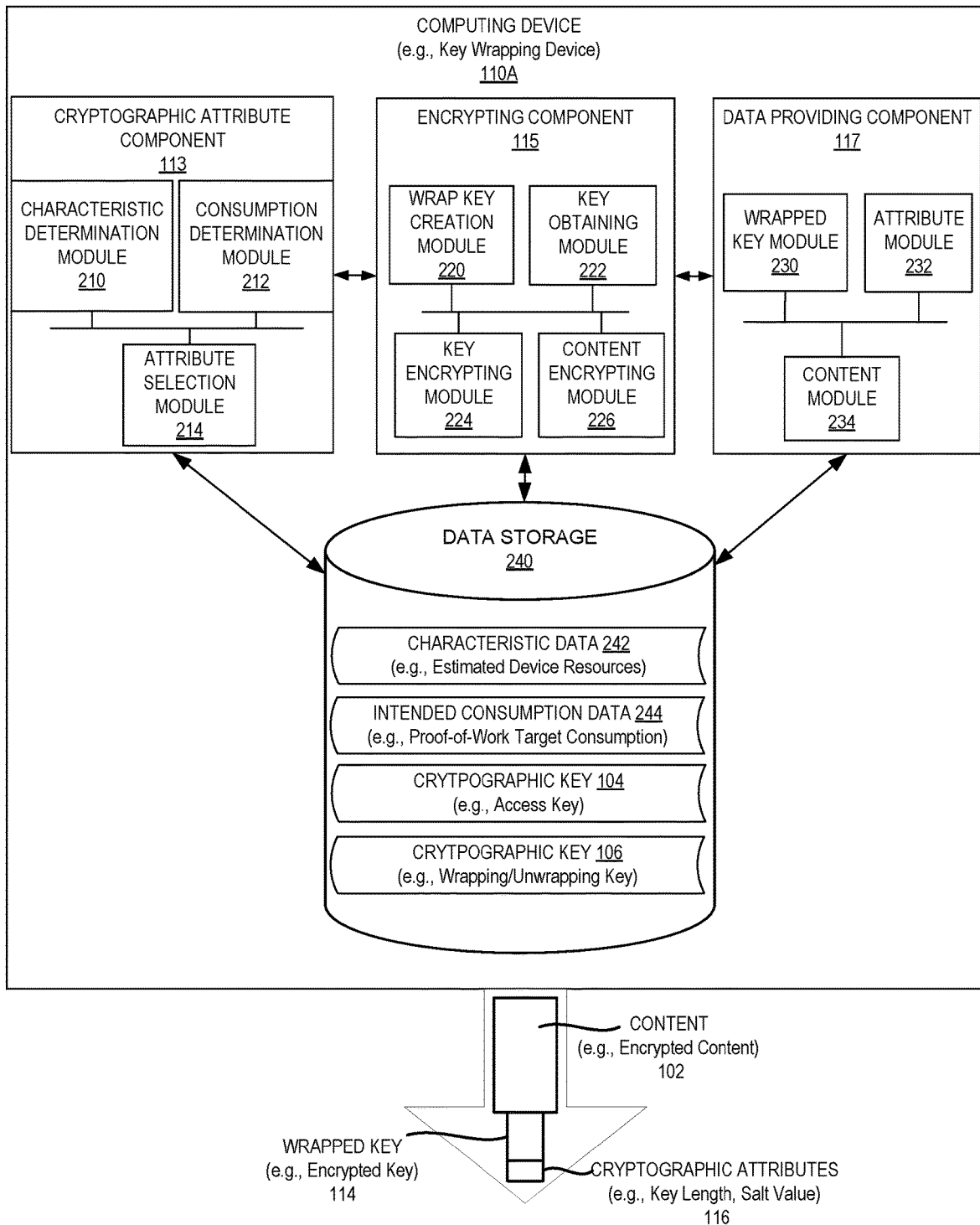
FIG. 2 depicts a block diagram of an example computing device with one or more components and modules for configuring a proof-of-work key wrapping system, in accordance with one or more aspects of the present disclosure.
Figure 3:
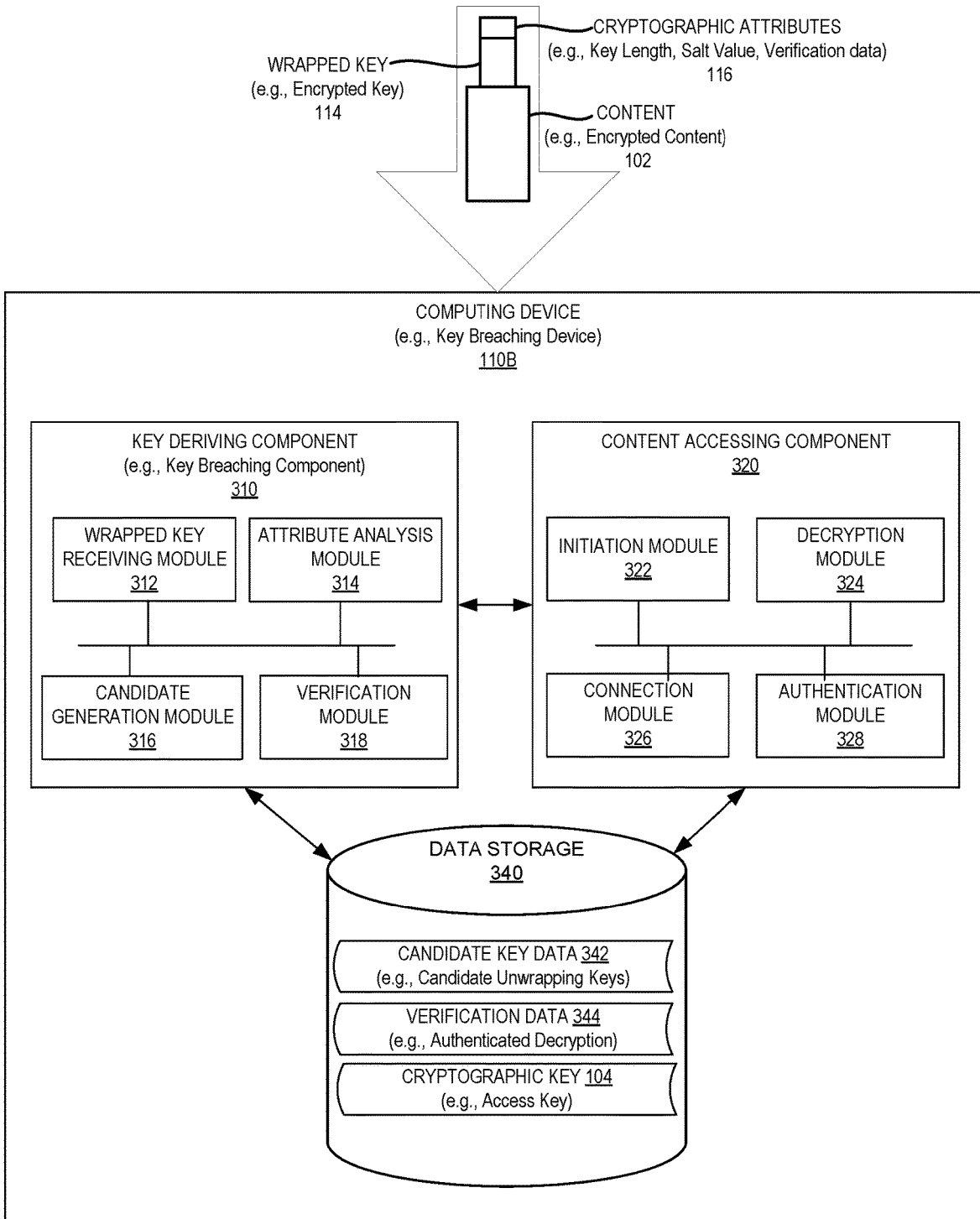
FIG. 3 depicts a block diagram of an example computing device with one or more components and modules to perform a proof-of-work key wrapping task to derive a key from a wrapped key, in accordance with one or more aspects of the present disclosure.

FIGS. 2 and 3 are block diagrams illustrating a more detailed example of computing devices 110A and computing device 110B respectively, in accordance with one or more aspects of the present disclosure. FIG. 2 includes an exemplary computing device 110A with modules for configuring a proof-of-work key wrapping scheme and FIG. 3 includes an exemplary computing device 110B with modules for breaching the wrapped key based on the proof-of-work key wrapping scheme.

In regards to FIG. 2, the components, modules, or features discussed in regards to computing devices 110A may be consolidated to a single computing device (e.g., a device that selects settings and wraps the key) or may be spread across multiple computing devices (e.g., one device selects settings and one or more other devices create and wrap the key). In the example shown, computing device 110A may include a cryptographic attribute component 113, an encrypting component 115, and a data providing component 117, which may be the same or different as those illustrated in FIG. 1.

Cryptographic attribute component 113 may enable computing device 110A to identify and select cryptographic attributes that cause a proof-of-work task (e.g., breaching the wrapped key) to consume a particular quantity of computing resources. In one example, cryptographic attribute component 113 may include a characteristic determination module 210, a consumption determination module 212, and an attribute selection module 214.

Characteristic determination module 210 may enable computing device 110A to determine characteristics of another computing device that will execute the proof-of-work task (e.g., breaching the wrapped key). The computing device executing the proof-of-work task may be referred to as a recipient computing device, an intended computing device, a target computing device, other term, or a combination thereof. In one example, the recipient computing device may be unknown when selecting the cryptographic attributes. In another example, the recipient computing device may be known and may or may not be contacted to determine the characteristics. In either example, characteristic determination module 210 may determine the characteristics using one or more operations that approximate, estimate, predict, or extrapolate the characteristics of an intended recipient computing device. The operations may be based on current data (e.g., devices accessing content), historical data (e.g., past devices accessing content), advertising data (e.g., advertised resource specifications), contractual data (e.g., service agreements), device modeling data (e.g., average resources of a smart phone, laptop, workstation, server, supercomputer), user input, data extrapolated from scientific projections of future resource availability, other data, or a combination thereof. The determined characteristics of a recipient computing device may be stored in data storage 240 as characteristic data 242.

Characteristic data 242 may include values that correspond to one or more computing resources of a recipient computing device. As discussed above, the computing resources of a recipient computing device may include hardware resources, program resources, other resources, or a combination thereof and characteristic data 242 may describe, indicate, or represent these resources. The values of characteristic data 242 may include one or more measurements, numbers, characters, strings, labels, or other value that correspond to a time, quantity, and/or rate of one or more of the computing resource. For example, characteristic data may include or indicate on or more processor speeds (e.g., 8.4 GHz), processor types (e.g., CPU, GPU, FPGA, ASIC), processor architecture (x86, powerPC®, Sparc®, ARM®), number of processors (e.g., 1, 2, 16), number of cores (e.g., dual core, quad core), disk space, memory size, memory I/O, processor I/O, networking I/O, program version (e.g., kernel version, kernel module, application feature), graphics acceleration, encoding/decoding acceleration, encryption/decryption acceleration, other resource details, or a combination thereof.

Consumption determination module 212 may enable computing device 110A to determine the quantity of computing resources that the proof-of-work task should consume in order to accomplish an intended goal (e.g., resource verification or temporal delay). Consumption determination module 212 may perform one or more calculations on input values to determine one or more output values. The input values and/or output values may include one or more mathematical functions or numeric values related to time, quantity, rate, other metric, or a combination thereof. Consumption determination module 212 may use the input and/or outputs as variables in one or more equations, formulas, models, other representation, or a combination thereof. In one example, consumption determination module 212 may solve a set of one or more equations to determine one or more output values. For example, the inputs may include a duration of time T (e.g., number of seconds) and a rate R (e.g., operations per second) and consumption determination module 212 may use a variation of the equation Rate (R)=Quality (Q)/Time (T) to determine a particular quantity. The particular quantity may correspond to the amount of computing resources (e.g., total number of operations) that should be consumed to accomplish the intended goal.

The intended goal may vary depending on the use case for the proof-of-work key wrapping and may be to impose a delay, to verify computing characteristics, other goal, or a combination thereof. In one example, the intended goal may be to delay the recipient computing device from accessing content and consumption determination module 212 may receive data indicating an intended time duration (e.g., user input designating a two day delay). Consumption determination module 212 may derive a rate of a recipient computing device from characteristic data 242 (e.g., operations per second of processor) and use the intended time duration and rate to determine a quantity. The quantity may correspond to the amount of the computing resource that the proof-of-work task should consume in order to delay the recipient computing device for the corresponding time duration.

In another example, the intended goal may be to test characteristics of the recipient computing device. Consumption determination module 212 may receive input indicating an intended rate of the computing resource (e.g., advertised processor rate or memory capacity of a virtual machine). Consumption determination module 212 may use the input rate and derive a quantity of the computing resource that the proof-of-work task should consume. The derived quantity may be a function of time as opposed to a particular time duration and one or more time durations may be selected as a threshold, which is discussed in more detail below. One or more of the input values or output values may be stored as intended consumption data 244 in data storage 240 and used by attribute selection module 214.

Attribute selection module 214 may enable computing device 110A to select the cryptographic attributes that control the quantity of computing resources consumed by a recipient computing device to derive the cryptographic key from the wrapped key. Attribute selection module 214 may execute two different roles when configuring the proof-of-work key wrapping and the roles may be performed together or separately. The first role is for selecting cryptographic attributes to use to create and encrypt (e.g., wrap) the cryptographic key. The second role is to select cryptographic attributes to provide to the recipient computing device to derive (e.g., unwrap) the cryptographic key.

The cryptographic attributes selected for wrapping the cryptographic key may be the same or different from the cryptographic attributes provided to the recipient computing device for unwrapping the cryptographic key. In one example, there may be a set of cryptographic attributes selected to wrap the cryptographic key and one or more cryptographic attributes from the set may be provided to the recipient computing device to unwrap the wrapped key. In another example, one or more of the cryptographic attributes provided for unwrapping the key (e.g., cryptographic attributes 116) may be absent from the set of cryptographic attributes for wrapping the cryptographic key. In either example, the cryptographic attributes may affect the quantity of computing resources consumed to by the recipient computing device.

The cryptographic attributes may be included in sets that each include one or more cryptographic attributes. A cryptographic attribute may relate to or indicate a feature of a cryptographic function, cryptographic input, cryptographic output, other data, or a combination thereof. The cryptographic function may be a Key Derivation Function (KDF) discussed below and may access cryptographic input and generate cryptographic output. The cryptographic input may include a seed value, salt value, output size (e.g., bit length), other data, or a combination thereof. Some or all of the cryptographic input may be provided to the cryptographic function as separate parameters, combined parameters, or a combination thereof. A cryptographic attribute may indicate a feature of a key (e.g., seed length) or may be data for deriving the key (e.g., seed, nonce, key fragment, key share). Examples of cryptographic attributes may indicate the size of an access key (e.g., 512 bit access key), size of the wrapping/unwrapping key (e.g., 128 bit unwrapping key), size of input to derive the key (e.g., salt value), other data, or a combination thereof. The set of cryptographic attributes 116 may be the same or similar to cryptographic constraints, limitations, restrictions, controls, settings, configurations, parameters, inputs, outputs, indicators, suggestions, hints, clues, other term, or a combination thereof.

Attribute selection module 214 may select the set of cryptographic attributes based on the characteristics of the recipient computing device by analyzing the characteristic data 242, intended consumption data 244, other data, or a combination thereof. In one example, the selection of the cryptographic attributes is intended to cause the recipient computing device to consume a predetermined quantity of computing resources. In another example, the selection of the cryptographic attributes is intended to cause the recipient computing device to consume a predetermined quantity of time. In either example, attribute selection module 214 may access characteristic data 242 that indicates characteristics of computing resources of the recipient computing device. Attribute selection module 214 may then access the intended consumption data 244 that indicates the intended quantity of the computing resources that should be consumed to breach a wrapped key.

Attribute selection module 214 may then calculate and select one or more sets of cryptographic attributes 116 in view of characteristic data 242, intended consumption data 244, other data, or a combination thereof. For example, a first cryptographic attribute may correspond to a key length that has multiple length options (e.g., 32 bit, 64 bit, 128 bit, 256 bit, 512 bit, 1024 Bit). The larger the key length the more computing resources would typically be consumed to identify the correct key. A second cryptographic attribute may correspond to a cryptographic function that has multiple options (key derivation functions A, B, and C). Attribute selection module 214 may then determine the quantity of computing resources consumed for one or more candidate combinations and select a candidate combination (e.g., 64 bit, key derivation function B) that satisfies the quantity indicated by the intended consumption data 244. Satisfaction of the quantity may be the candidate combination that is closest, closest without going under, closest without going over, other variation, or a combination thereof.

Encrypting component 115 may enable computing device 110A to encrypt data and the data may include content data, key data, or a combination thereof. Encrypting component 115 may use one or more keys to perform the encryption and a first key may be used to encrypt the content and a second key may be used to encrypt the first key (e.g., wrap the first key). The features of encrypting component 115 may be executed by the same computing device that selects the cryptographic attributes or may be executed by one or more different computing devices. In the example shown, encrypting component 115 may include a wrap key creation module 220, key obtaining module 222, a key encrypting module 224, and content encrypting module 226.

Wrap key creation module 220 may enable computing device 110A to create cryptographic key 106 for wrapping one or more other keys. Cryptographic key 106 may be used to encrypt a key and may be referred to as a wrap key, a wrapping key, an encryption key, or other term. Wrap key creation module 220 may create the wrap key in view of one or more of the selected cryptographic attributes 116, which may identify a cryptographic key function and one or more parameter values to use as input. The cryptographic key function may or may not incorporate a number generator (e.g., random or pseudo-random number generator) and the parameter values may include length data (e.g., 64 bit length indicator), salt data (e.g., salt values), nonce data (e.g., nonce values), seed data (e.g., seed values), key data (e.g., key fragment, key share), other data, or a combination thereof.

The cryptographic key function may be the same or similar to a key generator function (e.g., keygen), a key derivation function (KDF), other cryptographic function, or a combination thereof. In one example, a key generator function may create the wrap key based on a key length value (e.g., 128 bit) and a salt value that are derived from the selected cryptographic attributes. In another example, a key generator function may be a key derivation function that derives the wrap key in view of cryptographic key material (e.g., base key, seed value, salt value, nonce value) and may cause the resulting wrap key to be related to the cryptographic key material (e.g., mathematically related keys). The key derivation function may involve key strengthening (e.g., key hardening), key stretching (e.g., key lengthening), other key modification, or a combination thereof. The key derivation function may or may not enhance the security of the key or adjust the length of the key to comply with a particular format (e.g., minimum key length). In further examples, cryptographic key function may be a Password-Based Key Derivation Function (e.g., PBKDF1, PBKEDF2) that repeatedly applies a Hash-based Message Authentication Code (HMAC) and one or more salt values to cryptographic input to produce a cryptographic key. In any of the above examples, the resulting wrap key may be stored in data storage 240 as cryptographic key 106.

Key obtaining module 222 may enable computing device 110A to obtain the cryptographic key used to access the content (e.g., cryptographic key 104) so that it can be wrapped using cryptographic key 106. In one example, key obtaining module 222 may obtain cryptographic key 104 by creating it in a manner that is the same or similar to the process discussed above in regards to cryptographic key 106. The creation of cryptographic key 104 may or may not be based on one or more of the selected cryptographic attributes 116 and may use the same or different cryptographic key functions (e.g., two different key derivation functions). In another example, key obtaining module 222 may obtain cryptographic key 104 from a remote source or a local source. The remote source may be a remote computing device that is accessible over a network. The remote computing device may be another computing device (e.g., certificate authority, domain controller) that associated with a user, company, or service associated with computing device 110. The local source may be local to computing device 110A and may be in close proximity to computing device 110A (e.g., NFC, RFID, Bluetooth), directly attached to computing device 110A (e.g., USB Smart Card), integrated within computing device 110A (e.g., hardware embedded key). In either example, cryptographic key 104 may be subsequently stored in data storage 240.

Key encrypting module 224 and content encrypting module 226 may enable computing device 110A to encrypt different types of data. Key encrypting module 224 may include features for encrypting one or more cryptographic keys (e.g., key encryption) and content encrypting module 226 may include features for encrypting content that the recipient computing device intends to access using the wrapped key (e.g., content encryption). The process of encrypting a cryptographic key may be referred to as key wrapping, key encapsulation, or other term and may involve encoding cryptographic key material of key into a wrapped key that masks or hides the cryptographic key material from the recipient of the wrapped key until it is decrypted (e.g., unwrapped, unencapsulated).

Module 224 and 226 may use the same or different cryptographic systems. For example, key encrypting module 224 may use a weaker cryptographic system (e.g., smaller key length) to enable wrapped keys to be breached and content encrypting module 226 may use a stronger cryptographic system (e.g., larger key length) to increase the cost of access to the content in the absence of the access key. The cryptographic systems may be the same or similar to a symmetric key cryptographic system, an asymmetric key cryptographic system, other cryptographic system, or a combination thereof.

A symmetric key cryptographic system may use the same cryptographic keys for encryption of plaintext and for decryption of ciphertext. The cryptographic keys used in a symmetric key cryptographic system may be referred to as symmetric keys and may be identical keys (e.g., copies of the same key) or there may be a simple transformation to go between keys of a symmetric key pair. The symmetric key cryptographic system may involve stream ciphers, block ciphers, other cipher, or a combination thereof. The stream ciphers may encrypt individual elements (e.g., digits, characters) of a message one at a time. Block ciphers may take a set of elements and encrypt them as a single unit and may or may not pad the resulting plaintext so that it is a multiple of a block size of n bits (e.g., 64 bit, 128 bit, 256 bit, 1024 bit). In one example, the symmetric key cryptographic system may use one or more key wrap constructions that wrap or encapsulate cryptographic key material. The constructions may be built from standard primitives such as block ciphers and cryptographic hash functions. In other examples, the symmetric key cryptographic system may be the same or similar to Advanced Encryption Standard (AES), Galois/Counter Mode (GCM), Triple Data Encryption Standard (3DES, TDES), International Data Encryption Algorithm (IDEA), Blowfish, Lattice-based cryptography, multivariate cryptography (e.g., rainbow scheme), super singular elliptic curve cryptography, super singular isogeny graphs cryptography, other cryptographic system, or a combination thereof.

An asymmetric key cryptographic system may use different keys for encryption and decryption. A first key may be used to encrypt plaintext into ciphertext and a second key may be used to decrypt the ciphertext into plaintext. The first and second keys may be referred to as an asymmetric pair and may be different keys that may or may not be mathematically related. In one example, the asymmetric key cryptographic system may be a public key cryptographic system and the first key may be a public key and the second key may be a private key. The public key may be published and accessible to multiple computing devices and the private key may remain secret and accessible to one or more computing device associated with a particular entity (e.g., user). A public key cryptographic system may enable any device to encrypt data using the public key of a recipient computing device. The encrypted data may be decrypted with the recipient's private key. An advantage of asymmetric key cryptographic system is that it may avoid the need of a secure channel for an initial exchange of one or more cryptographic keys between the parties, which is often a challenge for symmetric cryptographic systems.

Data providing component 117 may enable computing device 110A to provide data for the proof-of-work key wrapping system to the recipient computing device to enable the recipient computing device to access protected content (e.g., confidential data, program data). The data being provided may be in the form of one or more data structures and may include one or more wrapped keys, cryptographic attributes, encrypted content, other data, or a combination there of Computing device 110A may provide the data to one or more recipient computing devices and the one or more recipient computing devices may be able to individually or collectively access the protected content as discussed in more detail in regards to FIG. 4-7. Computing device 110A may provide the data to the recipient computing device by either transmitting the data to the recipient computing device, by storing the data on a storage device that can be accessed by the recipient computing device, or by instructing one or more other devices to create, move, copy, or transmit data to the recipient computing device.

The data may be provided via one or more data structures that are transmitted over one or more transmission mediums. The transmission mediums may include one or more network connections, peer-to-peer connections, shared storage devices (e.g., USB drive, smart card), electronic mail, physical mail, other data transmission mechanism, or a combination thereof. The data structures may include one or more file system objects (e.g., file, directory, metadata), database objects (e.g., record, table, tuple), computer messages (e.g., network messages, email messages, text messages, instant messages, inter-process messages, interrupts, signals, other messages, or a combination thereof.

In the example shown in FIG. 2, data providing component 117 may include a wrapped key module 230, an attribute module 232, and a content module 234. Wrapped key module 230 may enable computing device 110A to provide one or more wrapped keys to recipient computing devices. In one example, a cryptographic key may be encoded as a single wrapped key and the single wrapped key may be provided to one or more recipient computing devices. In another example, a cryptographic key may be encoded in multiple wrapped keys and a portion of the cryptographic key may be included in each wrapped key (e.g., wrapped key fragment). In either example, wrapped key module 230 may provide the wrapped key 114 to at least one recipient computing device without providing a key to decrypt the wrapped key (e.g., no unwrapping key).

Attribute module 232 may include features that enable computing device 110A to provide one or more cryptographic attributes to enable the recipient computing device to derive a key from the wrapped key. The one or more cryptographic attributes provided to the recipient computing device may function as hints or clues that reduce the computational complexity of deriving cryptographic key 104 from the wrapped key 114. As discussed above, the cryptographic attributes provided to the recipient computing device may be from the set of selected cryptographic attributes used to wrap the key or may be a cryptographic attribute that is absent from the set. In either example, the one or more cryptographic attributes 116 provided to the recipient computing device may be based on or derived from the wrapped cryptographic key, a wrap key, an unwrap key, other data, a previously selected cryptographic key, or a combination thereof.

The cryptographic attribute may be provided to the recipient computing device with the wrapped key or provided separate from the wrapped key. In one example, providing the cryptographic attribute with the wrapped key may involve packaging them together in one or more data structures and providing them using one of the data transmission mediums (e.g., package 602 of FIG. 6). In another example, providing the cryptographic attribute separate from the wrapped key may involve storing them in separate data structures and sending them separately via the same transmission medium or different transmission mediums. In a further example, one or more of the cryptographic attributes (e.g., hints) may be embedded in the proof-of-work key wrapping protocol or the program implementing the protocol that is executing on the recipient computing device.

Content module 234 may enable computing device 110A to provide content 102 to recipient computing devices. Content 102 may be encrypted data that can be decrypted after the wrapped key 114 is unwrapped. As discussed above, content 102 may be provided with the wrapped key 114, cryptographic attribute 116, other data, or a combination thereof. Enabling the recipient computing device to derive cryptographic key 104 and access content 102 is discussed in more detail in regards to FIG. 3.

FIG. 3 is block diagram illustrating a more detailed example of a computing device 110B with modules for performing proof-of-work key wrapping tasks configured by computing device 110A of FIG. 2. The components, modules, and features discussed in regards to computing devices 110B may be consolidated to a single computing device (e.g., a single device that derives the key and uses it to access content) or may be spread across multiple computing devices (e.g., multiple device derive respective keys that are combined to enable access to the content).

Computing device 110B may receive data provided by one or more computing devices and may use the data to derive a cryptographic key to use to access content. The received data may include one or more wrapped keys 114, cryptographic attributes 116, content 102, other data, or a combination thereof. Computing device 110B may receive the data from the same source (e.g., computing device 110A) or from multiple different sources (e.g., computing device 110A and one or more local or remote data stores 120). In the example shown, computing device 110B may include a key deriving component 310 and a content accessing component 320.

Key deriving component 310 may enable computing device 110B to derive one or more access keys from one or more wrapped keys 114. In one example, deriving the access key from wrapped key 114 may involve deriving an unwrap key that can be used to decrypt the wrapped key 114 and expose the access key. In another example, deriving the access key from wrapped key 114 may involve deriving the access key from wrapped key 114 without identifying the unwrap key. In general, the cryptographic attributes discussed above may be selected so that deriving the unwrap key for the wrapped key is less computationally intensive than deriving the access key from the wrapped key in the absence of the unwrap key (e.g., easier to guess the unwrap key then the access key that is wrapped). In the example of FIG. 3, key deriving component 310 may include a wrapped key receiving module 312, an attribute analysis module 314, a candidate generation module 316, and a verification module 318.

Wrapped key receiving module 312 may include features for receiving one or more wrapped keys 114. As discussed above, wrapped key 114 may be included in a data structure that is received over a transmission medium. In one example, wrapped key receiving module 312 may receive wrapped key 114 over a network connection. In another example, wrapped key receiving module 312 may receive the key from a local or remote source that stores the wrapped key and the content that will be accessed using the unwrapped key. In either example, wrapped key 114 may be received with one or more cryptographic attributes 116 that are packaged with the wrapped key or received separate from cryptographic attributes (e.g., different sources, transmission mediums, or data structures). In response to receiving wrapped key 114, wrapped key receiving module 312 may store wrapped key 114 and the one or more cryptographic attributes 116 in data storage 340.

Attribute analysis module 314 may analyze cryptographic attributes that are associated with wrapped key 114. In the above example, at least one of the cryptographic attributes may be received from another computing device as discussed above. In another example, one or more cryptographic attributes may be embedded in the proof-of-work key wrapping protocol or a program implementing the client side of the proof-of-work key wrapping protocol (e.g., protocol always uses a specific key length or key derivation function).

Attribute analysis module 314 may analyze the cryptographic attributes (e.g., hints) to facilitate deriving the cryptographic key from wrapped key 114. Facilitating the derivation may involve reducing the computational complexity of deriving the access key from wrapped key 114. In one example, the cryptographic attributes may facilitate the derivation by reducing the amount of computing resources consumed by a brute force attack to discover an unwrap key that successfully decrypts the wrapped key 114. Example cryptographic attributes may include an indication of a cryptographic key function (e.g., key derivation function), a key size (e.g., unwrap key length, access key length), cryptographic key material (e.g., salt value, nonce value, seed value), other data, or a combination thereof.

Candidate generation module 316 may enable computing device 110B to generate candidate key material that can be used to derive the cryptographic key from wrapped key 114. The candidate key material may be a candidate key, a portion of a candidate key (e.g., key fragment), data for generating a candidate key, other data, or a combination thereof. The data may be input for one or more cryptographic key functions (e.g., key derivation functions) that generate the candidate key as discussed above. In one example, candidate generation module 316 may generate a set of candidate keys and store the set as candidate key data 342.

Verification module 318 may analyze the candidate key data 342 to verify whether any of the candidate keys are correct. Verifying whether a candidate key is correct may involve executing a verification function using verification data 344. Verification data 344 may include a verification code (e.g., tag), program data (e.g., executable code of verification code), configuration data (e.g., settings), other data, or a combination thereof. Verification data 344 may be included in the proof-of-work key wrapping client and/or provided with or included in wrapped key 114, cryptographic attribute 116, or content 102, or a combination thereof.

Verification module 318 may compare verification data 344 to other data to determine whether the candidate key is correct. The verification data may be a verification code that is the same or similar to an authentication tag, a message authentication code (MAC), other bit sequence, or a combination thereof. In one example, the verification code may be encrypted with the cryptographic key and therefore may be embedded in wrapped key 114. Verification module 318 may decrypt wrapped key 114 using the candidate key and compare the decrypted verification code to an expected value to determine whether the candidate key correctly decrypted wrapped key 114. In another example, the verification code may be encrypted with the content and therefore may be embedded in content 102. Verification module 318 may unwrap the wrapped key using the candidate key and then use the unwrapped key to decrypt the verification code and content 102. The verification code may be compared to an expected value to determine if the candidate key is correct. In either example, the verification process may also or alternatively involve Authenticated Encryption (AE), Authenticated Encryption with Associated Data (AEAD), Encrypt-then-Authenticate-Then-Translate (EAX), Encrypt-then-MAC (EtM), Encrypt-and-MAC (E&M), MAC-then-Encrypt (MtE), Key Wrap, Cipher Block Chaining MAC (CBC-MAC), Counter with CBC-MAC (CCM), EAX, other verification process, or a combination thereof.

Verification module 318 may analyze one or more candidate keys sequentially or in parallel until a candidate key that satisfies the validation process is identified. Verification module 318 may then use the identified candidate key (e.g., unwrap key) to derive cryptographic key 104 (e.g., the access key) from wrapped key 114 and store cryptographic key 104 in data storage 340. Cryptographic key 104 may be any cryptographic key material or bit sequence that enables computing device 110B to access protected content. In one example, cryptographic key 104 may be a decryption key, an authentication key, an authorization key, a signature key, a transport key, an integrity key, other key, or a combination thereof.

Content accessing component 320 may enable computing device 110B to use cryptographic key 104 after it is unwrapped to enable access to access controlled content (e.g., confidential data, program data). The process of enabling access may then involve decrypting the content, establishing a connection to access the content, authenticating a user or device, other mechanism, or a combination thereof. Enabling access may involve providing the unwrapped version of cryptographic key 104 as input to a cryptographic function. The cryptographic function may be the same or similar to the cryptographic function discussed above and may include one or more authentication functions, encryption/decryption functions, authorization functions, verification functions, integrity functions, non-repudiation functions, hash functions, other functions, or a combination thereof.

The cryptographic function may be executed on computing device 110B, on one or more other computing devices, or a combination thereof. In one example, computing device 110B may execute the cryptographic function locally using cryptographic key 104A. In another example, the cryptographic function may be executed by another computing device using cryptographic key 104. In either example, content accessing component 320 may perform or cause one or more operations to provide, establish, facilitate, allow, permit, arrange, or enable access to content 102. This may cause content 102 to be available to computing device 110B or to a user of computing device 110. In the example shown in FIG. 3, content accessing component 320 may include an initiation module 322, decryption module 324, a connection module 326, and an authentication module 328.

Initiation module 322 may enable computing device 110B to process a request to access the content. The request may be manually or automatically initiated based on input from a user, scheduler, management device, load balancer, other input, or a combination thereof. In one example, the proof-of-work key wrapping task may be manually initiated in response to receiving a user request initiating an action such as attempting to open a protected file, launching a VM or container, other action, or a combination thereof.

Decryption module 324 may enable computing device 110B to decrypt content 102 using cryptographic key 104B. Cryptographic key 104 may be a symmetric key for encrypting and decrypting data of content 102. The data may include encrypted message data, encrypted file data, encrypted database data, other data, or a combination thereof. The symmetric key used by the computing device 110B may be wrapped before, during, or after content 102 is encrypted and may be identical to the symmetric key used to encrypt the content.

Connection module 326 may enable computing device 110B to establish a communication channel using cryptographic key 104. The communication channel may be the same or similar to the communication channel 122 of FIG. 1 and may enable communication with another device (e.g., data store or computing device). Establishing the communication channel may involve using the cryptographic key 104 to authenticate the computing device by authenticating or authorizing a user, process, device, interface, address, port, socket, other computing structure, or a combination thereof. Establishing the communication channel may also or alternatively involve using the cryptographic key to verify message content received over the communication channel. In one example, cryptographic key 104 may include a session key and the processing device may use the session key to establish a communication channel (e.g., TLS or IPSec connection) for accessing the content.

Authentication module 328 may enable computing device 110B to use cryptographic key 104 to authenticate with one or more other computing devices. Cryptographic key 104 may function as a token or signature and authentication module 328 may initiate an authentication process and may provide the cryptographic key 104 with a request or response message.

Data storage 340 may include primary storage (e.g., volatile or non-volatile memory), secondary storage (e.g., hard drive, solid state drive), network storage (e.g., network attached storage (NAS), storage area network (SAN), cloud storage), other data storage, or a combination thereof.

Figure 4:
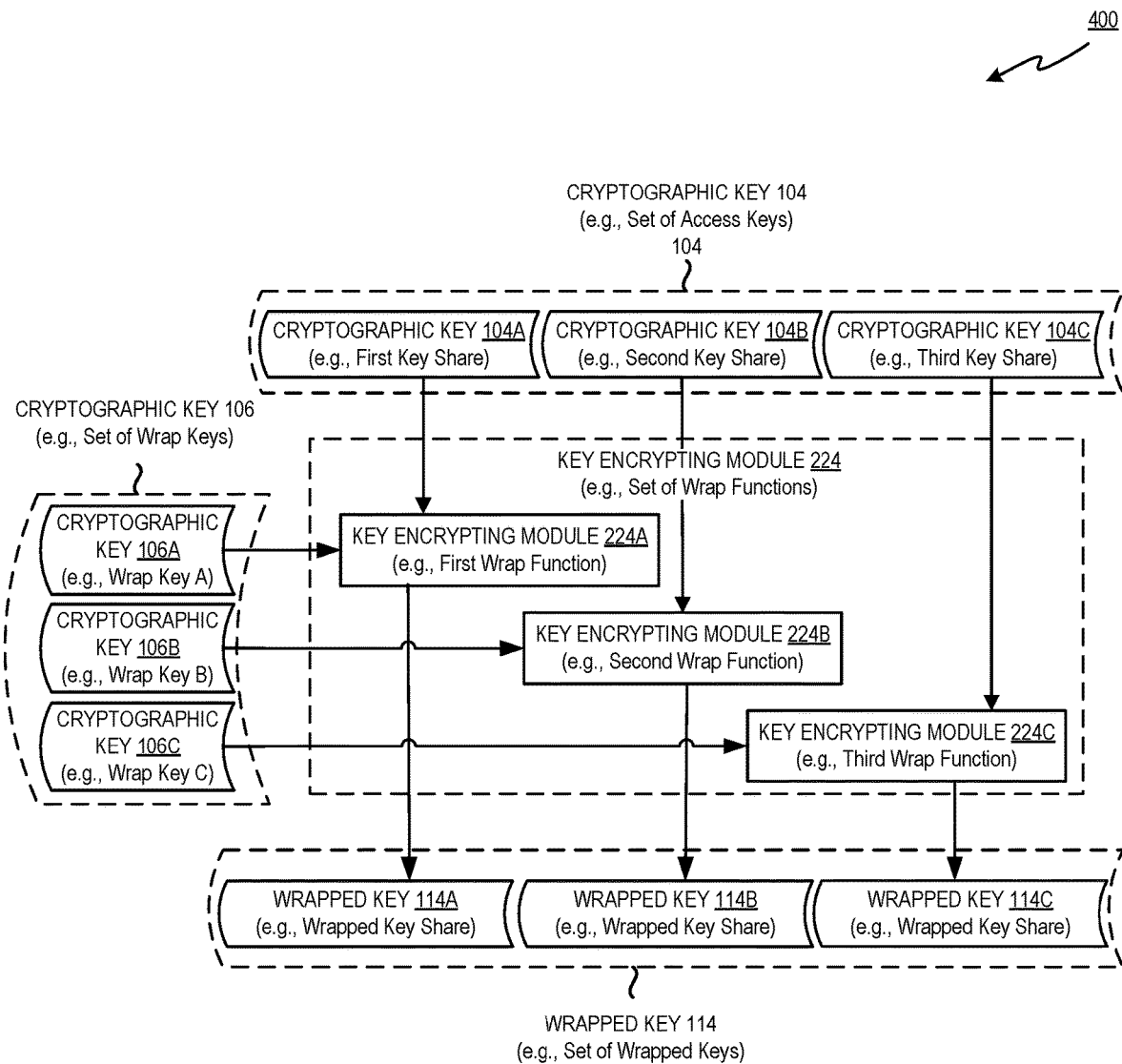
FIG. 4 depicts a block diagram of a proof-of-work key wrapping system that replaces the access key, wrapping key, and/or wrapped key with a set of corresponding keys, in accordance with one or more aspects of the present disclosure.

FIG. 4 is a block diagram that illustrate an example proof-of-work key wrapping system 400 that uses a set of multiple keys to replace the access key, wrap key, wrapped access key, or a combination thereof. The use of multiple keys may smooth out statistical variations that arise when attempting to approximate the amount of computing resources consumed by the proof-of-work key wrapping scheme. Approximating the amount of time or computing resources consumed to derive the cryptographic key may be a statistical operation that results in a statistical approximation. The statistical approximation may be an expected value that corresponds to an average consumption and the actual amount of computing resources consumed may vary between a best case scenario and worst case scenario. For example, deriving a cryptographic key from the wrapped key may involve identifying the unwrapping key using an exhaustive key search (e.g., brute force attack). The best case scenario may occur when the first candidate key attempted is the correct unwrapping key and the worst case scenario may occur when the last candidate key attempted is the correct unwrapping key. To smooth out the statistical variations the technology may involve deriving multiple keys instead of just deriving a single key. Due to the law of large numbers, performing multiple derivations causes the average derivation performed to approach the approximated average value and to diverge from the best and worst case scenarios. This enables the technology to implement a proof-of-work key wrapping mechanism that is more predictable and consistent in the amount of computing resources that are actually consumed in each instance.

Proof-of-work key wrapping system 400 may increase the number of keys being used by replacing one or more of the access key, the wrap key, the wrapping function, or the resulting wrapped key with corresponding sets. For example, the access key (e.g., cryptographic key 104) may be replaced with a set of access keys (e.g., cryptographic keys 104A-C), the wrap key (e.g., cryptographic key 106) may be replaced with a set of wrap keys (e.g., cryptographic keys 106A-C), and the resulting wrapped key 114 may be replaced by a set of wrapped keys 114A-C. The wrap function (e.g., key encrypting module 224) may remain the same or may be replaced by a set of wrap functions as shown (e.g., key encrypting modules 224-C). Each wrap key in the set may be used to encrypt a respective access key to produce the set of wrapped keys (e.g., wrapped keys 114A-C). The set of keys being wrapped (e.g., cryptographic keys 104A-C) may be the same or similar to key fragments, key shares, key parts, key portions, key segments, other term, or a combination thereof. The computing device performing the wrapping may use a different wrap key to wrap each of the key shares. For example, cryptographic key 106A-C (e.g., wrap keys) may be provided as input to one or more key encrypting modules (e.g., 224 or 224A-C) to wrap cryptographic keys 104A-C and produce wrapped keys 114A-C.

The use of multiple keys may affect the computing device configuring the key wrapping (e.g., computing device 110A of FIG. 2) and the computing device breaching the wrapped key (e.g., computing device 110B of FIG. 3). To account for the multiple keys, the technology may select and provide multiple sets of cryptographic attributes as opposed to a single set of cryptographic attributes. Each set of cryptographic attributes may be selected by a device configuring the proof-of-work key wrapping and may be provided to a device performing the proof-of-work key wrapping task (e.g., guessing the key). Each set of cryptographic attributes may correspond to one or more unwrap keys and may be used to create the wrapping key to perform the wrapping or to derive the unwrap key to perform unwrapping. The process of selecting and providing the data for multiple keys may be the same discussed above in regards to selecting and providing data for a single key. Each of the keys in a respective set may be used individually to perform a cryptographic task (e.g., encrypt/decrypt, wrap/unwrap) or may be combined together to perform the task. The keys in a set may be independent from one another or may be integrated with one another as discussed below in regards to FIGS. 5A and 5B.

Figure 5A:
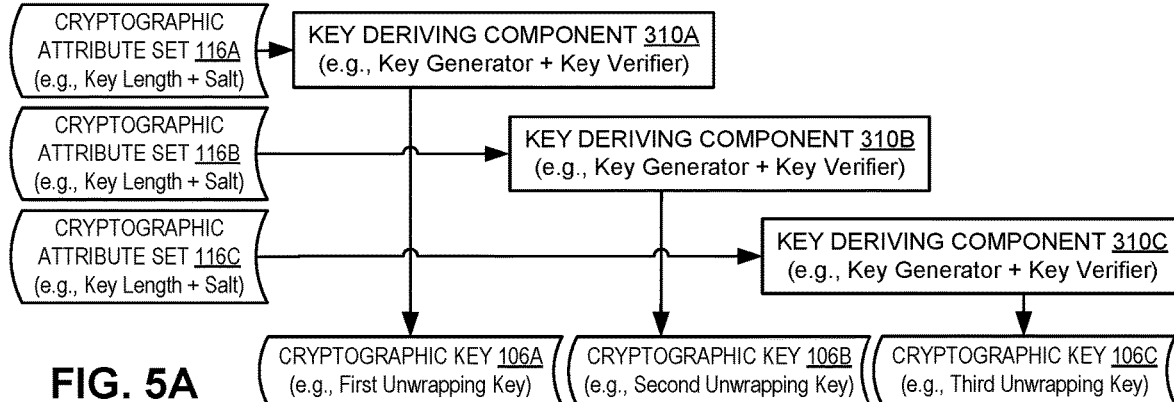
FIG. 5A depicts a block diagram of a key deriving process for deriving independent keys in parallel, in accordance with one or more aspects of the present disclosure.
Figure 5B:
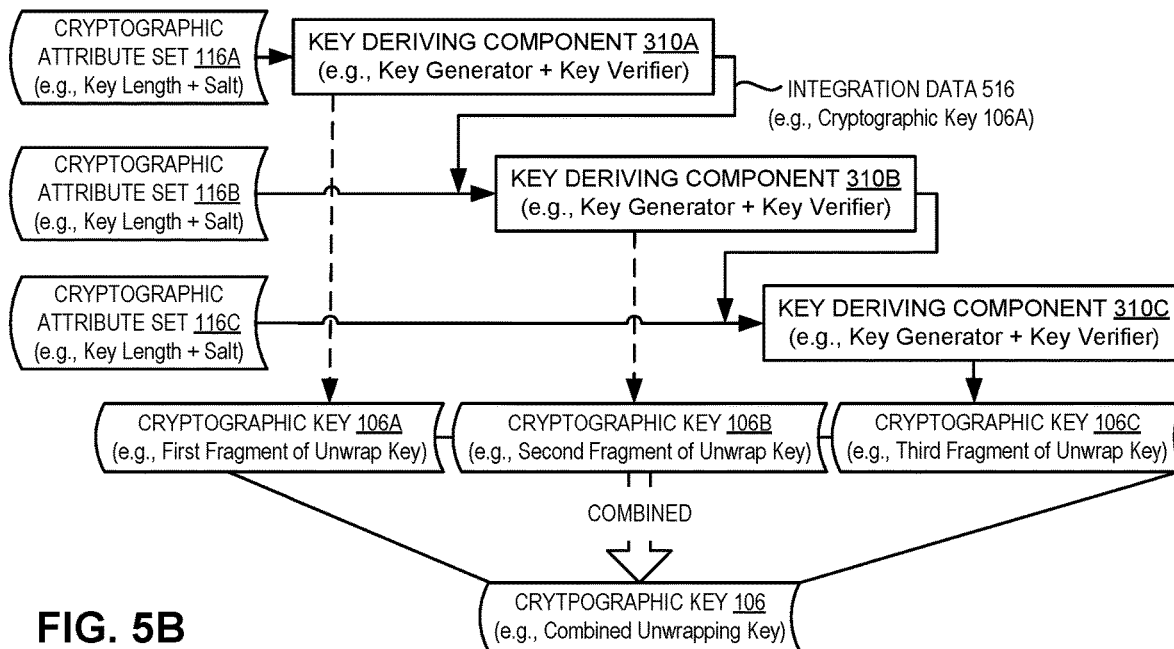
FIG. 5B depicts a block diagram of a key deriving process for deriving integrated keys in serial, in accordance with one or more aspects of the present disclosure.

FIG. 5A and FIG. 5B are block diagrams that illustrate processes executed by a recipient computing device to derive a set of keys. As discussed above, the set of keys may correspond to the access key, wrap key, wrapped key, or a combination thereof. In one example, the technology may replace the access key (cryptographic key 104) with a set of multiple keys (e.g., key fragments) that are each individually wrapped. The resulting wrapped keys (e.g., wrapped key fragments) may be provided to a recipient computing device and the recipient computing device may derive a key to unwrap each of the wrapped keys. In another example, the technology may replace the unwrapping key instead of or in addition to replacing the access key being wrapped. In this example, a single wrap key may be used to wrap and unwrap the access key and it may be replaced by a set of multiple unwrap keys. The unwrap keys in the set may be subsequently combined to unwrap the wrapped key (e.g., produce the original wrap/unwrap key). In either example, a key may be replaced by a set of keys by either using key splitting or key formation. The key splitting may involve generating an original key and then splitting the original key into fragments. The key fragments may then be combined to produce the original key. Key formation may involve creating the key fragments that can be subsequently combined without first creating the combined key. As used throughout this application, the term key may be a general term that corresponds to any portion of key material (e.g., bit sequence) that is used as input to a cryptographic function. The term key may correspond to an entire key, a fragment of a key (e.g., key portion, key part, key piece, key element, key unit, key share, key shard), a combined key (e.g., aggregate key, composite key, combination key, merged key), other bit sequence, or a combination thereof. A key fragment may be an example of a key and is used in discussing FIGS. 5A and 5B. Any use of the term key fragment or key share may be replaced with key without changing the concepts discussed.

The set of unwrapping keys may include unwrapping keys that are integrated with one another or may contain unwrapping keys that are independent from one another. A set of unwrapping keys that are integrated with one another may include an unwrapping key that is mathematically related to another key and is derived from another unwrapping key in the set. For example, at least one unwrapping key in the set may be generated by providing one or more of the other unwrapping keys in the set as input to a key derivation function. A set that includes unwrapping keys that are independent from one another (e.g., non-integrated) may include unwrapping keys that are all independent from one another and no key may be derived using another key of the set as input. In either example, one or more of the wrapped keys may be derived using the same cryptographic key function, different cryptographic key functions, or a combination thereof.

FIG. 5A and FIG. 5B provide examples of a proof-of-work key wrapping system that uses multiple keys to unwrap one or more wrapped keys. FIG. 5A includes example recipient computing device 500 that can derive a set of independent keys in parallel (e.g., concurrently, simultaneously). FIG. 5B includes an example recipient computing device 550 that can derive a set of integrated keys serially (e.g., sequentially). The integrated keys may be designed to stop the recipient computing device from deriving all of the keys in parallel because the input of at least one of the key deriving components includes the output key of a key deriving component. In either example, the recipient computing device may use the resulting derived keys for unwrapping a wrapped key. FIGS. 5A and 5B also illustrate how the resulting derived unwrapping keys may be used individually for unwrapping portions of an access key or may be combined and the combined key may be used to unwrap the access key.

In the examples shown in FIGS. 5A and 5B, each recipient computing device 500 and 550 may derive cryptographic keys 106A-C in parallel or serially using the one or more key deriving components 310A-C and one or more cryptographic attribute sets 116A-C. In the examples shown, a single recipient computing device may derive each one of the cryptographic keys 106A-C. In other examples, multiple recipient computing devices may collectively derive cryptographic keys 106A-C and each of the multiple recipient computing devices may derive one or more of cryptographic keys 106A-C.

Cryptographic attribute sets 116A-C may each include one or more cryptographic attributes for deriving a cryptographic key. The cryptographic attributes in sets 116A-C may be the same or similar to the cryptographic attributes 116 of FIG. 1-3. Some of the cryptographic attributes in sets 116A-C may the same between sets and some of the cryptographic attributes in sets 116A-C may be different between sets. In one example, each of the cryptographic attribute sets 116A-C may be different and used to derive a different cryptographic key. In another example, two or more of the cryptographic attribute sets 116A-C may be the same and combined with other data (e.g., output of cryptographic key function and/or nonce) to derive different cryptographic keys using key deriving component 310A-C.

Key deriving components 310A-C may be the same or similar to key deriving component 310 of FIG. 3 and may include key generation features and the key verification features discussed above. In one example, each of key deriving components 310A-C may use the same cryptographic key function (e.g., key derivation function). In other examples, key deriving components 310A-C may use different cryptographic key functions. In either example, the cryptographic key function used by a respective key deriving component may be indicated by one of the cryptographic attributes, a proof-of-work protocol, a client program implementing the proof-of-work protocol, other data, or a combination thereof.

Key deriving components 310A-C of both FIG. 5A and FIG. 5B may take cryptographic attribute sets 116A-C as input and output cryptographic keys 106A-C. One or more of the key deriving components of FIG. 5B may also take as input integration data 516 from one or more key deriving components. The integration data 516 may be from an earlier iteration of the key deriving component, from another instance of the same key deriving component, output from a different key deriving component (e.g., on the same or different device), other variation, or a combination thereof. In the example shown in FIG. 5B, key deriving component 310A may receive cryptographic attribute set 116A that includes a key length (e.g., 128 bit size), a salt value (e.g., 0x1010), a nonce (e.g., 11110000), other data, or a combination thereof. Key deriving component 310A may then try multiple different candidate keys until it identifies cryptographic key 106A, which satisfied the verification function. Cryptographic key 106A may then be stored and cryptographic key 106A and cryptographic attribute set 116B may be provided to key deriving component 310B as separate input (e.g., different parameters or sources) or as combined input (e.g., same parameter). Key deriving component 310B may then try multiple different candidate keys that are based on cryptographic key 106A (e.g., mathematically related) until it identifies cryptographic key 106B, which satisfies the corresponding verification function. Cryptographic key 106B may then be stored and provided as input to key deriving component 310C. In one example, key deriving component 310C may take as input one or more of the previously derived cryptographic keys (e.g., cryptographic key 106A or both cryptographic keys 106A and 106B). This process may be repeated for each subsequent key deriving component (not shown) to identify any subsequent cryptographic keys (not shown).

Each of the cryptographic keys 106A-C of FIGS. 5A and 5B may be the same or similar to cryptographic key 106 of FIGS. 1-3 and may be used to unwrap one or more wrapped access keys. In FIG. 5A, each of the derived cryptographic keys 106A-C may be used to unwrap a different wrapped key. For example, the access key may have been split and each fragment of the access key may have been individually wrapped and each of cryptographic keys 106A-C may be used to unwrap a respective individually wrapped fragment of the access key. In FIG. 5B, each of the derived cryptographic keys 106A-C may be a fragment of an unwrapping key and cryptographic keys 106A-C may be combined to create cryptographic key 106 that can be used to unwrap the wrapped access key.

The proof-of-work key wrapping system discussed above may be further enhanced to use key thresholding. Key thresholding may enable a recipient computing device to access content without deriving all of the keys in a set. For example, the set of keys may include n keys (e.g., 7 keys) and the recipient computing device may derive a subset of the keys (e.g., 3 keys) and the subset of keys may be used together to enable the recipient computing device to access content. The subset of keys may be combined into a combined key to access the content even though one or more keys of the set are unknown to the recipient computing device. The keys in the subset may be provided to a cryptographic function individually as separate inputs or combined and provided as a single combined input. Any of the proof-of-work key wrapping systems discussed herein may implement key thresholding by replacing the access key, the wrap key, the resulting wrapped key, or a combination thereof with a corresponding set. The keys used for key thresholding may be referred to as key shares and may be the same or similar to key fragments, key parts, key portions, key segments, other term, or a combination thereof. A subset of the keys (e.g., only first and last key share) may enable the recipient computing device to access content and all or a subset of the keys in the set may be encrypted and provided to the recipient computing device. Therefore, as soon as the one or more recipient computing devices derive enough keys to satisfy the minimum number of keys (e.g., threshold) they may be used to access the content.

The computing device that configures the proof-of-work key wrapping may wrap each key using a different wrap key to produce different wrapped keys (e.g., wrapped key shares). For example, cryptographic key 106A-C (e.g., wrap keys) may be provided as input to key encrypting module 224A-C to wrap cryptographic keys 104A-C and produce wrapped keys 114A-C. In other examples, proof-of-work key wrapping system may apply key thresholding to the access key (e.g., cryptographic key 104), to the unwrap key (e.g., cryptographic key 106), to other key material, or a combination thereof.

FIGS. 4, 5A, and 5B provide multiple different enhancements that can be used interchangeably in the examples discussed above and can be used individually or combination to increase the number of keys the recipient computing device needs to derive in order to access data. The enhancements may include key splitting and/or key thresholding and may be applied to the access key, unwrap key, other key, or a combination thereof. In the examples discussed in regards to FIG. 1, there may be a single access key (cryptographic key 104) that is encrypted and can be decrypted using a single unwrap key (cryptographic key 106). The multiple enhancements discussed above enable the proof-of-work key wrapping system to replace the access key, unwrap key, or both with a set of keys that work in combination with one another (e.g., key fragments). For example, key thresholding may be used to replace the access key with a set of access keys (e.g., access key shares) that can be individually wrapped and provided to one or more recipient computing devices. The keys used to unwrap each wrapped key may be split to produce multiple corresponding sets of unwrap key fragments. Each key fragment may correspond to a set of cryptographic attributes (e.g., hints) that may be provided to a recipient computing device with the wrapped key shares so that the recipient computing device and derive and combine the key shares to access the content controlled using the proof-of-work key wrapping system.

By applying these enhancements a proof-of-work key wrapping system may use a large number of keys that may need to be derived. Extending the example discussed above, the access key may be replaced by a set of A keys (e.g., 8 access key fragments/shares) that are each individually wrapped and correspond to a single unwrap key (e.g., fragments of an aggregate unwrap key). Each of the unwrap keys may be replaced by a set of B keys (e.g., 4 unwrap key shares). As a result, the recipient computing device may need to derive up to A×B keys (e.g., 32 key fragments) to derive the original access key (cryptographic key 104). If key thresholding is applied to both sets then the number may be reduced. For example, there may be a threshold for the access key set ($T_a$) (e.g., 50% of the set) and a threshold for the unwrap key set ($T_b$) (e.g., 75% of set). This will result in the recipient computing device needing to derive a minimum of $[A \times T_a] \times [B \times T_b]$ keys (e.g., minimum of 12 of the 32 key shares). These keys may be integrated or independent and may be collectively derived by one or more recipient computing devices in parallel or serially according to the above examples.

Figure 6:
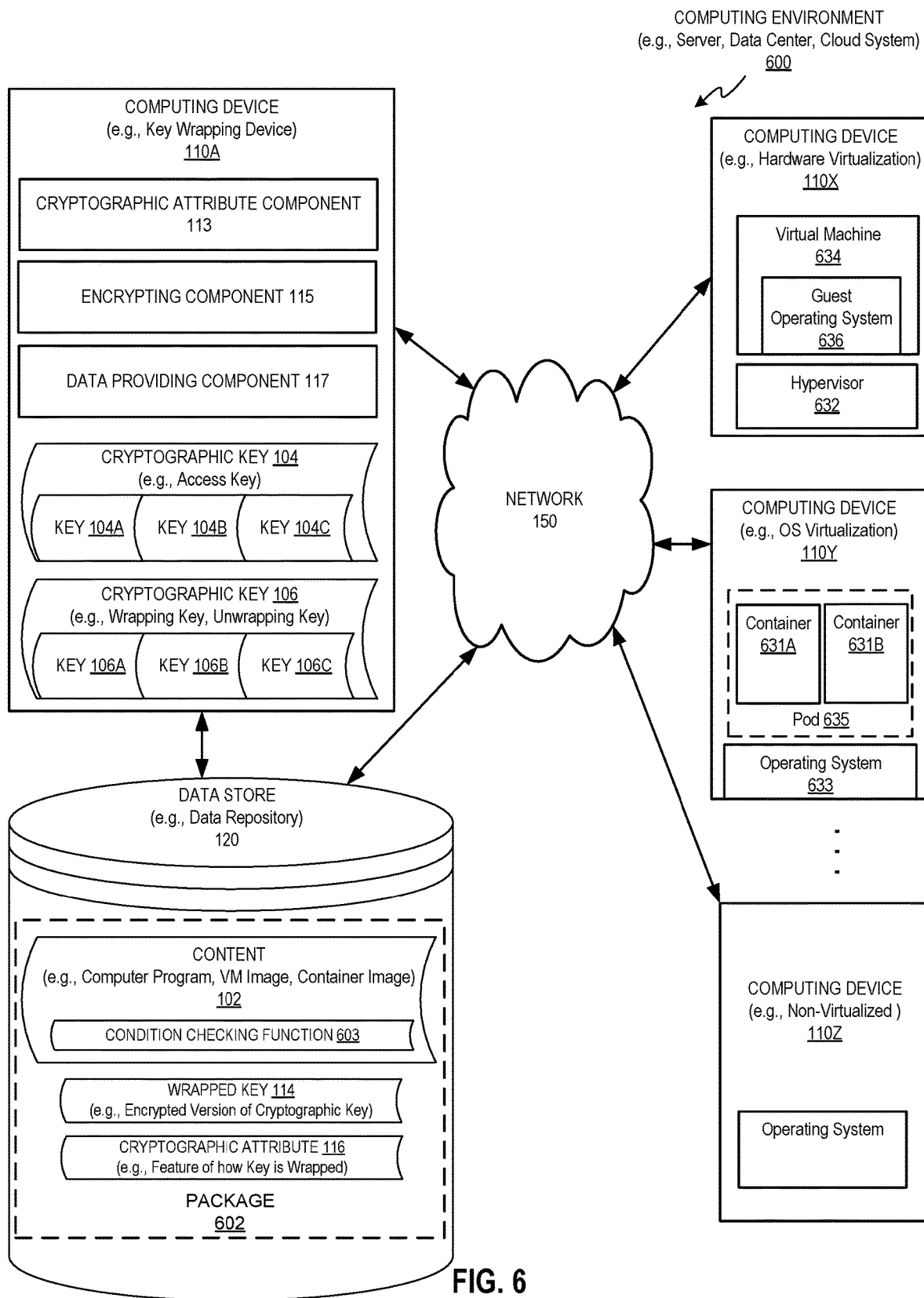
FIG. 6 depicts another example computing environment that may use a proof-of-work key wrapping system to verify characteristics of a computing device, in accordance with one or more aspects of the present disclosure.

FIG. 6 is a block diagram illustrating a computing environment 600 that may use a proof-of-work key wrapping system discussed above to verify computing characteristics of a recipient computing device, in accordance with one or more examples of the disclosure. The technology may be used to ensure that computing resources of a recipient computing device are capable of providing a threshold level of performance. This may be accomplished by configuring the proof-of-work key wrapping system with cryptographic attributes that target characteristics of the computing resources of a recipient computing device. As discussed above, the selection of the cryptographic attributes may cause the process of breaching the wrapped key to consume a particular quantity of computing resources. By further incorporating a time determination feature the technology can determine how long the breach takes and therefore calculate a rate of the computing resources (e.g., rate (R)=quantity (Q)/time (T)).

The rate of the computing resources may be used to quantify the performance of the computing resources and may be compared to one or more threshold values (e.g., predetermined threshold values) to detect whether the recipient computing device satisfies the threshold value. The threshold value may be based on a value advertised by a provider of computing resources or a minimum rate requested by a consumer of the computing resource. For example, the threshold value may be a value corresponding to speed, capacity, bandwidth, other performance metric, or a combination thereof (e.g., processor speed, memory size, network bandwidth). The threshold value may correspond to a cloud computing device (e.g., host machine), a distributed computing device (e.g., edge computing node), an end user device (e.g., smart phone, laptop), internet of things device (e.g., smart speaker), other computing device, or a combination thereof.

In the example shown in FIG. 6, computing environment 600 may include computing devices 110A-Z, data store 120, and a network 150 that may be the same or similar to the corresponding entities in FIG. 1. Computing device 110A may configure the proof-of-work key wrapping system and one or more of the computing devices 110B-Z may perform the work to derive an access key from one or more wrapped keys.

Computing device 110A may configure the proof-of-work key wrapping system by selecting cryptographic attributes and wrapping cryptographic keys in view of the cryptographic attributes. Computing device 110A may incorporate key splitting, key thresholding, individual keys, integrated keys, other features, or a combination thereof to configure the proof-of-work key wrapping system. The wrapped cryptographic keys may be provided to a recipient computing device to enable the recipient computing device to access content 102 (e.g., program data). Computing device 110A may include a cryptographic attribute component 113, an encrypting component 115, and a data providing component 117, which may be the same or similar to the components discussed in regards to FIGS. 1-2. Cryptographic attribute component 113 may select one or more sets of cryptographic attributes to control the quantity of computing resources consumed by the proof-of-work key wrapping system. For example, selecting different options for key lengths, salt values, or cryptographic functions affect the quantity of computing resources a recipient computing device consumes to derive the cryptographic key from the wrapped key. As discussed above in regards to FIG. 2, the cryptographic attributes in a single set may be selected to cause the recipient computing device to consume a particular quantity of computing resources to derive a single key. Multiple sets of cryptographic attributes may be selected when the recipient computing devices is deriving multiple keys (e.g., multiple keys for unwrapping the access key).

Deriving multiple keys using the multiple cryptographic attribute sets may result in smoothing out statistical variations. This enables the computing resources that are actually consumed to derive a key to be closer to the approximated amount and further from the best case and worst case scenarios, as discussed above in regards to FIGS. 5A-5B. The use of multiple sets of cryptographic attributes may also enable the proof-of-work key wrapping system to verify different characteristics of the recipient computing device. The process of deriving each key may function as a computational puzzle that is customized to verify a particular characteristic of the recipient computing device. The characteristics may relate to any of the computing resources discussed above and may relate to one or more hardware resources, program resources, other resources, or a combination thereof. For example, cryptographic attribute component 113 may identify n sets of cryptographic attributes (e.g., 3 sets) that will each be used to enable the recipient computing device to derive a different key. A first set of cryptographic attributes may result in a computational puzzle that focuses on a first characteristic (e.g., brute force attack that is processor intensive), the second set of cryptographic attributes may result in a computational puzzle that focuses on a second characteristic (e.g., brute force attack that is memory intensive), and the third set may result in a computational puzzle that focuses on a third characteristic (e.g., brute force attack that is I/O intensive).

If the recipient computing device is able to derive all three keys (e.g., solve all the computational puzzles) in a predetermined duration of time then it may indicate the recipient computing device satisfies the minimum threshold for each of the three characteristics being verified. As such, the technology can be used to verify the characteristics of the recipient computing device satisfy one or more performance and/or capacity thresholds. The computational puzzles can be configured to focus on any one or more characteristics discussed above in regards to characteristic data 242 of FIG. 2 or elsewhere in this application. In one example, if the recipient computing device fails satisfying one of the groups of characteristics it may attempt to satisfy another one of the groups to qualify.

The proof-of-work key wrapping system may be configured to use independent keys, integrated keys, or a combination thereof to verify the characteristics of the recipient computing device. The use of independent keys may enable the recipient computing device to perform each of the derivation processes in parallel which may make it harder to approximate the computing resources consumed or the threshold time. To enhance the predictability and consistency the proof-of-work key wrapping system may use integrated keys which will stop the one or more recipient computing devices from performing the key derivation in parallel and cause the key derivation to be done serially (sequentially, not concurrently).

The proof-of-work key wrapping system may be configured to use key thresholding to verify the characteristics of the recipient computing device (e.g., satisfies at least 2 of the 3 characteristics). For example, the proof-of-work key wrapping system may be configured to include different computational puzzles that test different characteristics of the recipient computing device but a recipient computing device may be sufficient if it solves a threshold number of the computational puzzles without solving all the computation puzzles. This may involve using proof-of-work key wrapping system of FIG. 5 and the key thresholding may be configured so that a subset of the keys can be derived without deriving all keys (e.g., derive 2 of the 3 keys within the threshold period of time). Extending the example discussed above, there may be multiple sets of cryptographic attribute sets (e.g., three sets) that correspond respectively to multiple different characteristics that are being verified (e.g., three characteristics). When the recipient computing device satisfies any two of those characteristics it can used the resulting two keys (e.g., key shares) to decrypt the cryptographic key and use it to access the data.

The key thresholding for the proof-of-work key wrapping may be further extended to test alternative groups of characteristics and satisfaction of at least one of the groups enables the recipient computing device to qualify (e.g., device passes test). Each group of characteristics may include one or more characteristics and a first group may include a first characteristic (e.g., GPU speed above threshold) and a second group may include a second and third characteristics (e.g., CPU speed above threshold and memory capacity above threshold). The recipient computing device may satisfy either group within the predetermined amount of time to qualify as being verified. In one example, if the recipient computing device may fail to satisfy one of the groups of characteristics (e.g., GPU missing or insufficient) and it may satisfy another one of the groups (e.g., CPU and memory are sufficient).

Content 102 may include program data that the recipient computing device can execute but the program data may remain un-executable until the recipient computing device derives the access key. Content 102 may be the same or similar to content 102A-Z of FIG. 1 and may include program data for one or more computer programs, virtual machine images, container images, other executable data structures, or a combination thereof. The program data may include executable data (e.g., machine code), non-executable data (e.g., configuration data, settings files), other data, or a combination thereof and may be stored in data store 120.

Data store 120 may function as a data repository (e.g., program repository, image repository) and may include program data for one or more programs. Data store 120 may be the same as the data store 120 of FIG. 1 and may be local to the recipient computing device or remote from the recipient computing device. The program data may be stored in data store 120 as one or more data storage objects (e.g., files, records). In one example, the program data may stored in a package 602 with the wrapped key 114, cryptographic attribute 116, other data or a combination thereof.

The program data may include a condition checking function 603 that may be executed after the recipient computing device has gained access to the program data. Condition checking function 603 may be a portion of program data that enables the recipient computing device to check that a condition is satisfied. The condition may be related to whether the recipient computing device was able to derive the key within a predetermined duration of time. Checking the condition may involve determining a duration of time associated with key derivation and comparing the duration of time to an expected value (e.g., predetermined threshold time). Condition checking function 603 may determine the time duration by checking time data that includes one or more current times, past times, future times, or a combination thereof. The time data may be derived from a device time (e.g. system time, processor time), storage object time (e.g., file access time, creation time modification time, execution time), process or thread time (e.g., initiation time, aggregate execution time, termination time), other time data, or a combination thereof.

The time data may be analyzed to identify a time duration or analyzed to identify multiple times that may be compared to determine the time duration. For example, a first time may correspond to a time the key derivation began (e.g., start time for proof-of-work key wrapping task) and may be based on a time before, during, or after the recipient computing device accesses the wrapped key 114, the cryptographic attribute 116, or a combination thereof. A second time may correspond to the time the key derivation completed and may be based on a time before, during, or after the recipient computing device accesses, modifies, or executes program data. Condition checking function 603 may compare the first time and the second time to determine a time duration and may adjust the times or duration to more accurately reflect the duration of time consumed by the key derivation process. For example, the duration of time may be reduced to account for the amount of time it takes to use the access key to access program data. Accessing program data may be the same as accessing content (e.g., content accessing component 320 of FIGS. 1-2) and may involve data decryption, connection establishment, or device authentication. The times may also or alternatively be adjusted in view of time associated with instantiating, deploying, initializing, configuring, other operation, or a combination thereof. Condition checking function 603 may then use the adjusted or unadjusted time to determine whether the condition is satisfied. Based on the output of condition checking function 603, the program data may perform one or more actions.

The actions performed by the program data may include one or more operations and may depend on whether the condition was satisfied. The action may involve terminating a program, providing a signal indicating the condition (e.g., fail message), disabling a feature, enabling a feature, other action, or a combination thereof. In one example, program data may be a computer program and in response to the status of the condition the computing program may terminate execution (e.g., exit) or continue execution (e.g., proceed). Terminating execution may involve terminating itself or another process executing on the recipient computing device or another device. In another example, programming data may include instructions for providing a signal (e.g., message, indicator) from the recipient computing device to another device to indicate a status of the condition (e.g., satisfied or unsatisfied). The signal may be provided to a management device that configured the proof-of-work key wrapping or to another device that manages the program data (e.g., provisioning server, deployment server, installation server, load balancer, etc.).

Computing devices 110X-Z provide example recipient computing devices that may execute programming data. Each of the computing device 110X-Z may correspond to at least one physical processing device that is capable of executing one or more computing operations. The term "computing device" may refer to a physical machine, a virtual machine, a container, or a combination thereof. Computing devices 110X-Z may provide one or more levels of virtualization for executing program data and the levels may include hardware level virtualization, operating system level virtualization, other virtualization, or a combination thereof. The hardware level virtualization may involve a hypervisor (e.g., virtual machine monitor) that emulates portions of a physical system and manages one or more virtual machines. In contrast, operating system level virtualization may include a single operating system kernel that manages multiple isolated virtual containers. Each virtual container may share the kernel of the underlying operating system without requiring its own kernel.

Computing device 110X is an example of a computing device that provides hardware level virtualization. Computing device 110X may execute a hypervisor 632 that provides hardware resources to one or more virtual machines 634. Hypervisor 632 may be any program or combination of programs and may run directly on the hardware (e.g., bare-metal hypervisor) or may run on or within a host operating system (not shown). The hypervisor may be the same as a virtual machine monitor and may manage and monitor various aspects of the operations of the computing device, including the storage, memory, and network interfaces. The hypervisor may abstract the physical layer hardware features such as processors, memory, and I/O devices, and present this abstraction as virtual devices to a virtual machine 634 executing a guest operating system 636.

Guest operating system 636 may be any program or combination of programs that are capable of managing computing resources of virtual machine 634 and/or computing device 110X. Guest operating system 636 may include a kernel comprising one or more kernel space programs (e.g., memory driver, network driver, file system driver) for interacting with virtual hardware devices or physical hardware devices. In one example, guest operating system 636 may include Linux®, Solaris®, Microsoft Windows®, Apple Mac®, other operating system, or a combination thereof.

Computing device 110Y may be similar to computing device 110X and may provide operating system level virtualization by running a computer program that provides computing resources to one or more containers 631A-B. Operating system level virtualization may be implemented within the kernel of operating system 633 and may enable the existence of multiple isolated containers. In one example, operating system level virtualization may not require hardware support and may impose little to no overhead because programs within each of the containers may use the system calls of the same underlying operating system 633. This may enable computing device 110Y to provide virtualization without the need to provide hardware emulation or be run in a virtual machine (e.g., intermediate layer) as may occur with hardware level virtualization. Operating system level virtualization may provide resource management features that isolate or limit the impact of one container (e.g., container 631A) on the resources of another container (e.g., container 631B).

The operating system level virtualization may provide a pool of computing resources that are accessible by container 631A and are isolated from one or more other containers (e.g., container 631B). The pool of resources may include file system resources (e.g., particular file system state), network resources (e.g., particular network interfaces, sockets, addresses, or ports), memory resources (e.g., particular memory portions), other computing resources, or a combination thereof. The operating system level virtualization may also limit (e.g., isolate) a container's access to one or more computing resources by monitoring the container's activity and restricting the activity in view of one or more limits. The limits may restrict the rate of the activity, the aggregate amount of the activity, or a combination thereof. The limits may include one or more of file system limits, disk limits, input/out (I/O) limits, memory limits, CPU limits, network limits, other limits, or a combination thereof.

Operating system 633 may include an operating system virtualizer that may provide containers 631A-B with access to computing resources. The operating system virtualizer may wrap one or more processes (e.g., of a particular service) in a complete file system that contains the code, runtime, system tools, system libraries, and other data present on the node (e.g., a particular file system state) that can be used by the processes executing within the container. In one example, the operating system virtualizer may be the same or similar to Docker® for Linux® or Windows®, ThinApp® by VMWare®, Solaris Zones® by Oracle®, other program, or a combination thereof. In one example, the operating system virtualization may support and automate the packaging, deployment, and execution of applications inside containers (e.g., Open Shift®).

Each of the containers 631A-B may refer to a resource-constrained process space of computing device 110Y that can execute functionality of the program data. Containers 631A-B may be referred to as user-space instances, virtualization engines (VE), or jails and may appear to a user as a standalone instance of the user space of operating system 633. Each of the containers 631A-B may share the same kernel but may be constrained to use only a defined set of computing resources (e.g., CPU, memory, I/O). Aspects of the disclosure can create one or more containers to host a framework or provide other functionality of a service (e.g., web application functionality, database functionality) and may therefore be referred to as "service containers" or "application containers."

Pod 635 may be a data structure that is used to organize one or more containers 631A-B and enhance sharing between the containers, which may reduce the level of isolation between containers within the same pod. Each pod may include one or more containers that share some computing resources with another container associated with the pod. Each pod may be associated with a unique identifier, which may be a networking address (e.g., IP address), that allows applications to use ports without a risk of conflict. A pod may be associated with a pool of resources and may define a volume, such as a local disk directory or a network disk and may expose the volume to one or more (e.g., all) of the containers within the pod. In one example, all of the containers associated with a particular pod may be co-located on the same computing device 110Y. In another example, the containers associated with a particular pod may be located on different computing devices that are on the same or different physical machines.

Network 150 may be a public network (e.g., the internet), a private network (e.g., a local area network (LAN) or wide area network (WAN)), or a combination thereof. In one example, network 150 may include a wired or a wireless infrastructure, which may be provided by one or more wireless communications systems, such as a wireless fidelity (WiFi) hotspot connected with the network 150 and/or a wireless carrier system that can be implemented using various data processing equipment, communication towers, etc.

Figure 7:
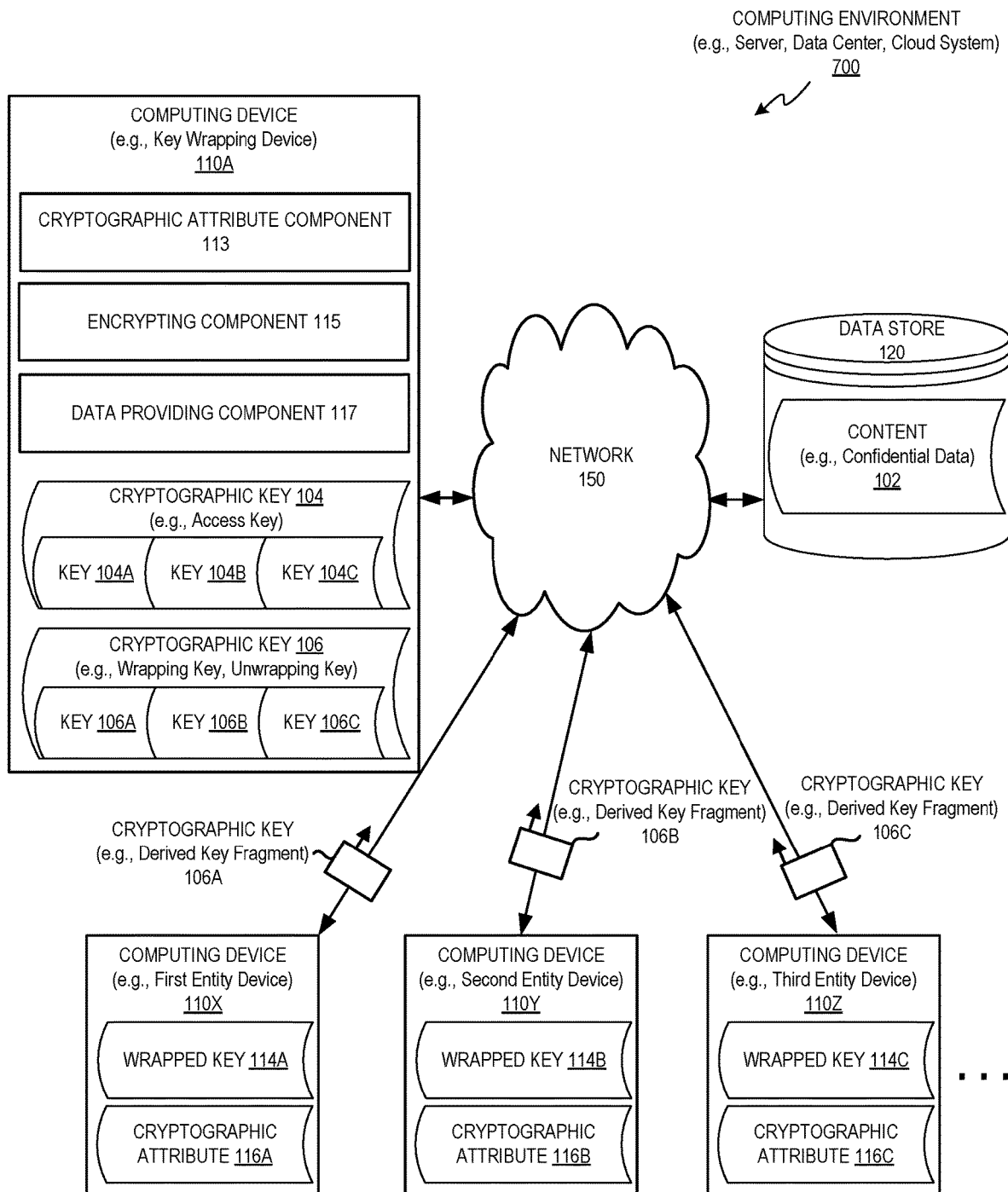
FIG. 7 depicts another example computing environment that may use a proof-of-work key wrapping system to temporally restrict access to content, in accordance with one or more aspects of the present disclosure.

FIG. 7 is a block diagram illustrating an example computing environment 700 that may use a proof-of-work key wrapping system discussed above to cryptographically implement a temporal delay for accessing protected content, in accordance with one or more examples of the disclosure. The technology may incorporate key splitting, key thresholding, individual keys, integrated keys, other features, or a combination thereof to impose or induce the temporal delay on one or more recipient computing devices. In the example shown in FIG. 7, the wrapped keys 114A-C may be provided to multiple recipient computing devices and the proof-of-work key wrapping system may ensure that the multiple recipient computing devices work together to access content 102. The multiple recipient computing devices may be associated with different entities (e.g., different companies) and may collaborate and use the resulting access key to access content 102.

Content 102 may be the same or similar to the content discussed in regards to FIG. 1 (e.g., content 102A-C) and may be any intangible or tangible content that a computing device or user can be restricted from accessing. In one example, content 102 may include confidential data that is received by the recipient computing device but cannot be accessed by the recipient computing device for a particular duration of time (e.g., information embargo). In another example, content 102 may be data that enables an operation to be performed and the operation may involve deleting data after time duration expires (e.g., data retention), transmitting data after time duration expires (e.g., transmitting press release), other action, or a combination thereof. The operation may enable a transaction (e.g., computer transaction, financial transaction) and the transaction may be associated with one or more smart contracts.

A smart contract may be a computerized transaction protocol that executes the terms of an agreement. The smart contract may utilize a distributed ledger (e.g., blockchain)

that is visible to computing device 110A-Z and may digitally facilitate, verify, or enforce the negotiation or performance of the agreement. Smart contracts may enable one or more of the computing devices 110X-Z to perform a transaction that is trackable and irreversible without the use of third parties. The smart contract may have portions (e.g., clauses, fields, values) that can be made partially or fully self-executing, self-enforcing, or both and may involve multiple computing devices 110A-Z which may correspond to the same or different entities.

Computing device 110A-Z may be the same or similar to the computing devices of computing environments 100 and 600 and computing device 110A may configure the proof-of-work key wrapping system and one or more of the computing devices 110B-Z may perform the computational work to derive an access key from one or more wrapped keys (e.g., the proof-of-work tasks). In one example, the proof-of-work key wrapping system may use multiple keys and may provide a set of cryptographic attributes to each of recipient computing devices 110X-Z to enable the recipient computing device to derive a key. Each recipient computing device may contribute its derived key (e.g., cryptographic key 104A-C) to be combined to access content 102.

Computing devices 110X-Z may each function as a recipient computing device and may be associated with one or more entities. The entities may be any business associations (e.g., companies, corporations, and partnerships), government associations (e.g., branch, department, agency, and bureau), institutions, organizations, departments, subsidiaries, establishments, or other entity. Each of the entities may be different and may be independent from one another. The recipient computing devices may each be associated (e.g., owned, operated, or managed, by) a respective entity. In one example, computing device 110X may be associated with a first entity that is a service provider (e.g., cloud service), computing device 110Y may be associated with a second entity that is a service consumer (e.g., cloud consumer), and computing device 110Z may be associated with a third entity that provides a third party service (e.g., IT management service).

Computing devices 110X-Z may each be provided with at least one respective cryptographic attribute 116A-C and wrapped key 114A-C and may derive respective cryptographic keys 104A-C. In one example, one or more of the derived cryptographic keys 104A-C may be transmitted or shared between computing devices 110X-Z (e.g., one or more of the devices gets each of the key fragments). In another example, the derived cryptographic keys 104A-C may be shared with another device (e.g., data store 120) that may combine the keys and use the combined keys to enable access or use of content 102.

FIGS. 8-15 depict flow diagrams of illustrative methods for enabling access to content using a proof-of-work key wrapping system, in accordance with one or more aspects of the present disclosure. The methods and each of their individual functions, routines, subroutines, or operations may be performed by one or more processors of a computer device executing the method. In certain implementations, an example method may be performed by a single computing device. Alternatively, an example method may be performed by two or more computing devices and each of the computing devices may execute one or more individual functions, routines, subroutines, or operations of the method.

For simplicity of explanation, the example methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. The example methods may be performed by computing device 110A of FIG. 2, computing device 110B of FIG. 3, other computing device, or a combination thereof.

Figure 8:
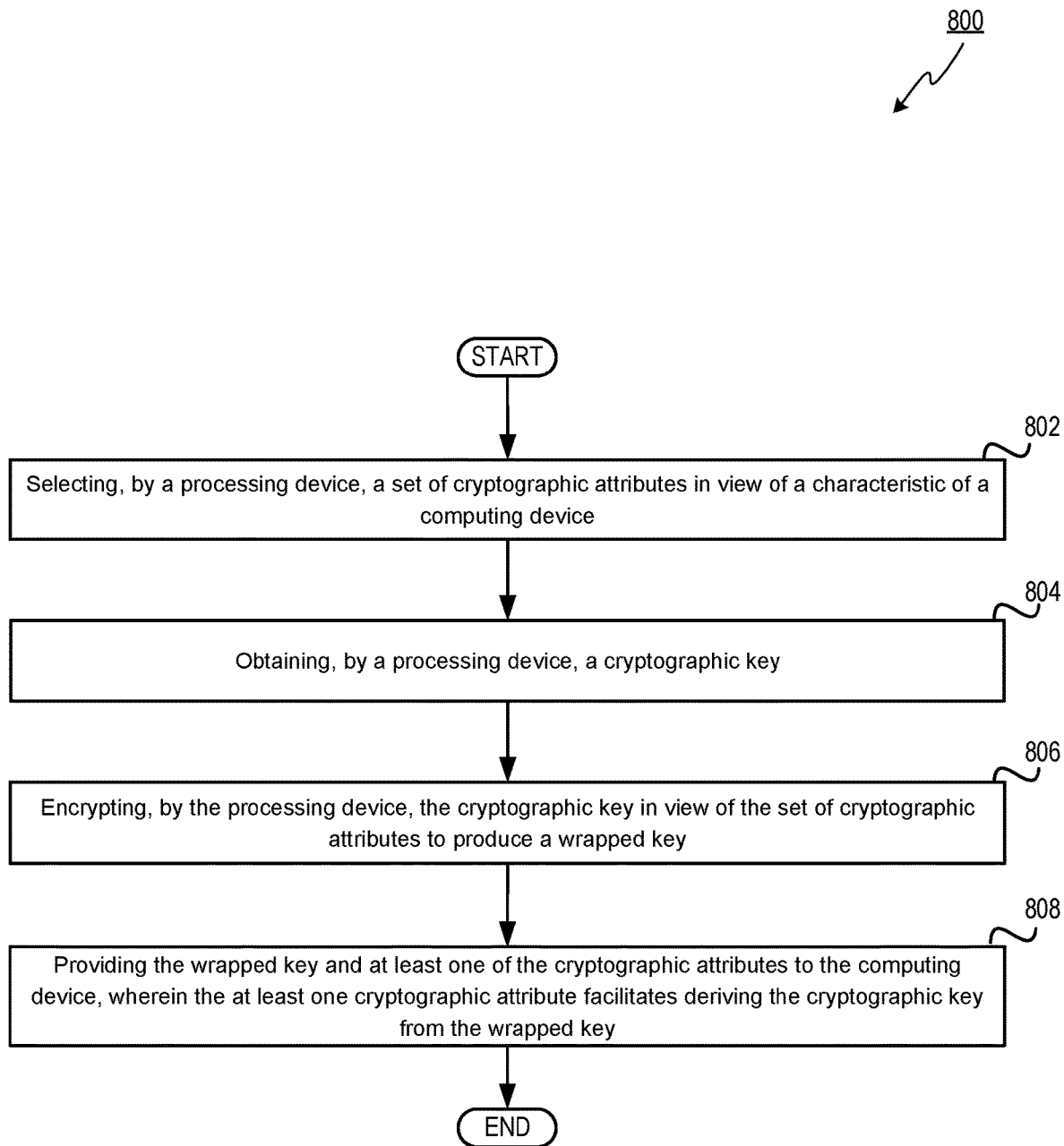
FIG. 8 depicts a flow diagram of an example method for configuring a proof-of-work key wrapping system to cryptographically control access to data, in accordance with one or more aspects of the present disclosure.

Referring to FIG. 8, example method 800 may be depicted as a flow diagram and involve configuring a proof-of-work key wrapping system to cryptographically control access to data in accordance with one or more aspects of the present disclosure. Method 800 may be executed by one or more processing devices of a client device or server device and may begin with block 802. At block 802, a processing device may select a set of cryptographic attributes in view of a characteristic of a computing device. Selecting the set of cryptographic attributes may involve predicting the characteristic of one or more computing resources of the computing device and estimating a quantity of the one or more computing resources consumed to breach a key wrapped in view of a set of candidate cryptographic attributes. The processing device may select the set of candidate cryptographic attributes that correspond to an estimated quantity that exceed a minimum threshold value. In one example, the selection of the cryptographic attributes in the set may involve selecting cryptographic attributes that enable the computing device to breach the wrapped key by consuming a predetermined quantity of computing resources. In another example, the selection of the cryptographic attributes in the set may involve selecting cryptographic attributes that enable the computing device to breach the wrapped key in a predetermined quantity of time.

At block 804, the processing device may obtain a cryptographic key. Obtaining the cryptographic key may involve retrieving the cryptographic key from a local or a remote source (e.g., local storage or from a device over a network). Obtaining the cryptographic key may also or alternatively involve generating one or more cryptographic keys. A first cryptographic key may be for encrypting the content and may be generated using a first key derivation function and the second cryptographic key may be used for encrypting the first cryptographic key and be generated using a second key derivation function.

At block 806, the processing device may encrypt the cryptographic key in view of the set of cryptographic attributes to produce a wrapped key. Encrypting the cryptographic key may involve generating the second cryptographic key in view of the set of cryptographic attributes and wrapping the cryptographic key using the second cryptographic key. In one example, the cryptographic key may be a symmetric key to encrypt and decrypt the content and the second cryptographic key may be a symmetric key for wrapping and unwrapping the cryptographic key.

At block 808, the processing device may provide the wrapped key and at least one of the cryptographic attributes to the computing device. The at least one cryptographic attribute may facilitate a recipient computing device derive the cryptographic key from the wrapped key. Providing the at least one cryptographic attribute may involve transmitting an indication of a key length, a key derivation function, or a salt value to the computing device. Providing the cryptographic attribute to the computing device may reduce computing resources consumed by a brute force attack of the wrapped key. Responsive to completing the operations described herein above with references to block 808, the method may terminate.

Figure 9:
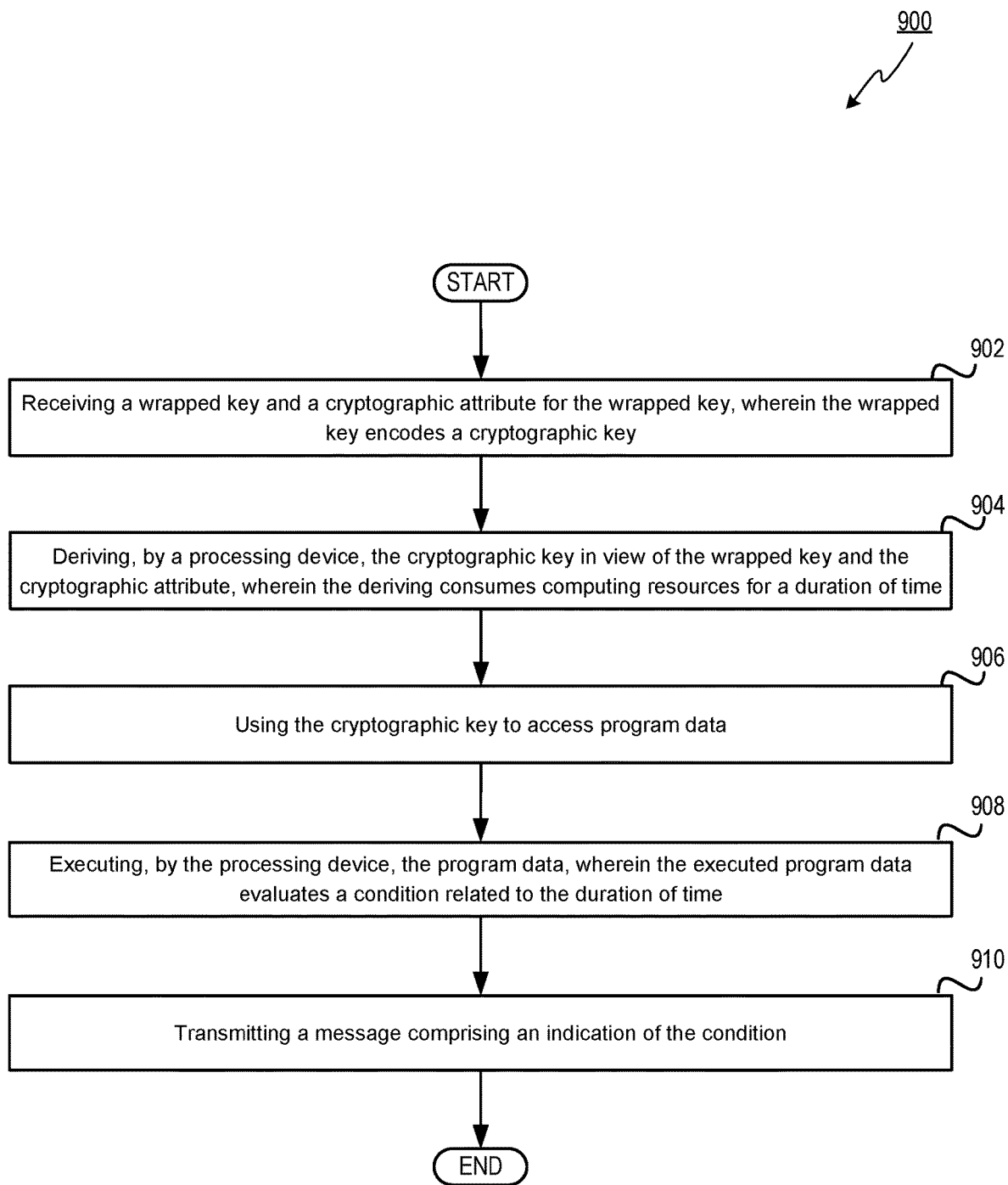
FIG. 9 depicts a flow diagram of an example method for using a proof-of-work key wrapping system to verify device capabilities, in accordance with one or more aspects of the present disclosure.

Referring to FIG. 9, example method 900 may be depicted as a flow diagram and involve using a proof-of-work key wrapping system to verify device capabilities, in accordance with one or more aspects of the present disclosure. Method 900 may be executed by one or more processing devices of a client device or server device and may begin with block 902. At block 902, a processing device may receive a wrapped key and a cryptographic attribute for the wrapped key. The wrapped key encodes a cryptographic key and the cryptographic attribute may include a cryptographic attribute of a cryptographic key used to generate the wrapped key. In one example, the cryptographic attribute may include one or more of a key length, a key derivation function, or a salt value.

At block 904, the processing device may derive the cryptographic key in view of the wrapped key and the cryptographic attribute. The deriving may consume computing resources for a particular duration of time. Deriving the cryptographic key may involve deriving the cryptographic key from the wrapped key without being provided a key to unwrap the wrapped key. In one example, deriving the cryptographic key may involve generating and verifying a plurality of candidate cryptographic keys for unwrapping the wrapped key in view of the cryptographic attribute.

At block 906, the processing device may use the cryptographic key to access program data. The program data may include executable data of at least one of a computer program, a virtual machine image, or a container image. In one example, the program data may be accessible over a connection and using the cryptographic key to access the program data may involve establishing the connection using the cryptographic key. In another example, the program data may be encrypted and using the cryptographic key to access the program data may involve decrypting the program data in view of the cryptographic key. The encrypted version of the program data and the wrapped key may or may not be packaged together.

At block 908, the processing device may execute the program data. The executed program data may evaluate one or more conditions related to the duration of time of the derivation. The duration of time for deriving the cryptographic key may or may not satisfy a predetermined minimum threshold value which may correspond directly to a speed of the computing resources.

At block 910, the processing device may transmit a message comprising an indication of the condition. Transmitting the message may involve transmitting a message to a device that generated the wrapped key and the message may indicate that the deriving of the cryptographic key in view of the wrapped key occurred within a predetermined minimum threshold time. Responsive to completing the operations described herein above with references to block 908, the method may terminate.

Figure 10:
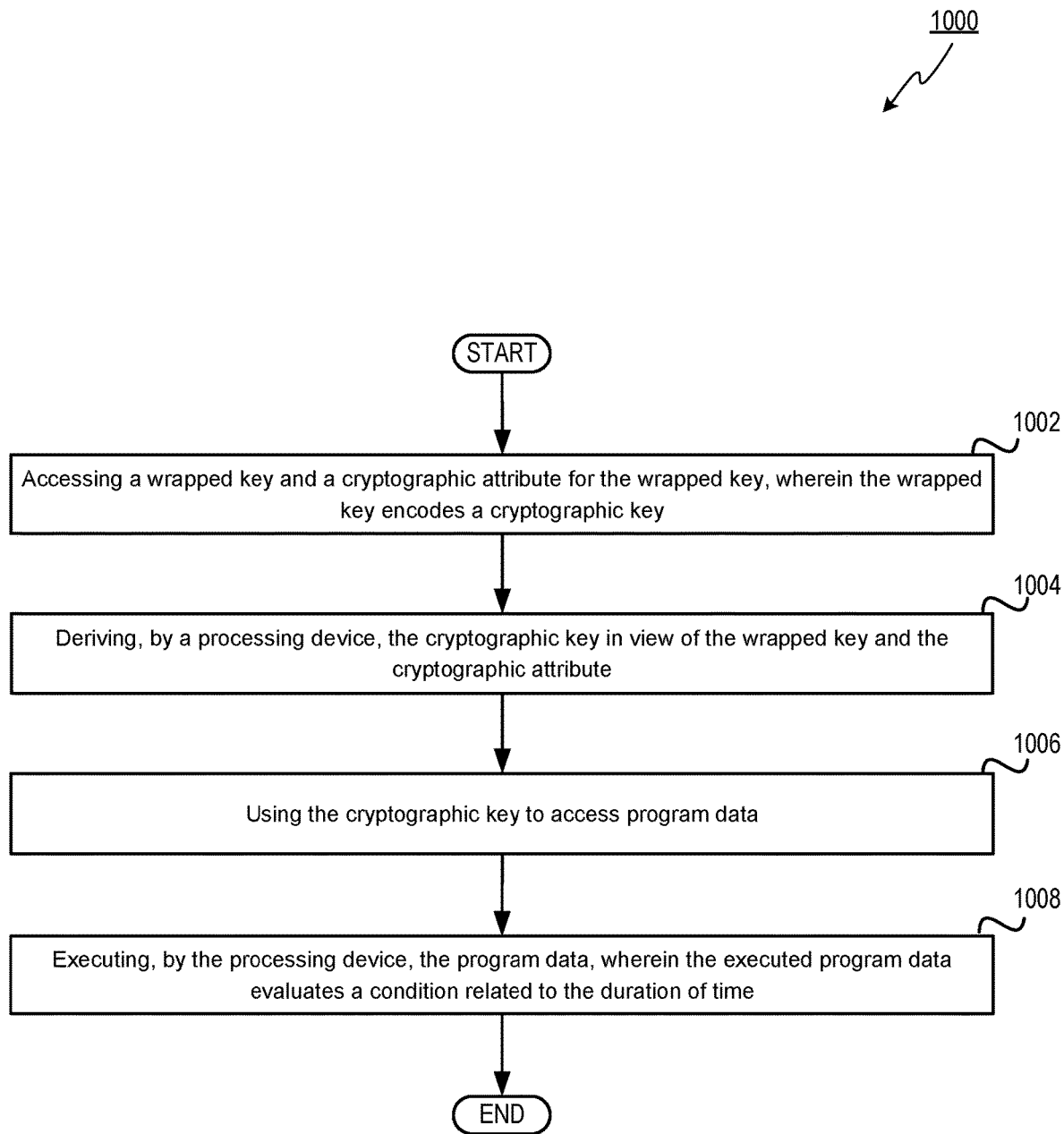
FIG. 10 depicts a flow diagram of an example method for using a proof-of-work key wrapping system to restrict data execution based on device capabilities, in accordance with one or more aspects of the present disclosure.

Referring to FIG. 10, example method 1000 may be depicted as a flow diagram and involve using a proof-of-work key wrapping system to restrict data execution based on device capabilities, in accordance with one or more aspects of the present disclosure. Method 1000 may be executed by one or more processing devices of a client device or server device and may begin with block 1002. At block 1002, a processing device may access a wrapped key and a cryptographic attribute for the wrapped key. The wrapped key may encode a cryptographic key and the cryptographic attribute may indicate a cryptographic attribute of a cryptographic key used to generate the wrapped key. In one example, the cryptographic attribute may include one or more of a key length, a key derivation function, or a salt value.

At block 1004, the processing device may derive the cryptographic key in view of the wrapped key and the cryptographic attribute. Deriving the cryptographic key may involve deriving the cryptographic key from the wrapped key without being provided a key to unwrap the wrapped key. The deriving of the cryptographic key may involve generating and verifying a plurality of candidate cryptographic keys for unwrapping the wrapped key in view of the cryptographic attribute.

At block 1006, the processing device may use the cryptographic key to access program data. The program data may include executable data of at least one of a computer program, a virtual machine image, or a container image. In one example, the program data may be accessible over a connection and using the cryptographic key to access the program data may involve establishing the connection using the cryptographic key. In another example, the program data may be encrypted and using the cryptographic key to access the program data may involve decrypting the program data in view of the cryptographic key. The encrypted version of the program data and the wrapped key may or may not be packaged together.

At block 1008, the processing device may execute the program data. The executed program data may evaluate one or more conditions related to the duration of time of the derivation. The duration of time for deriving the cryptographic key may or may not satisfy a predetermined minimum threshold value which may correspond directly to a speed of the computing resources. The executing program data may perform an action in response to determining the duration of time does not satisfy a predetermined minimum threshold value. The action may involve one or more of terminating the execution of the program data, providing a signal to an entity hosting the program data, or providing a signal to an entity providing the program data. Responsive to completing the operations described herein above with references to block 1008, the method may terminate.

Figure 11:
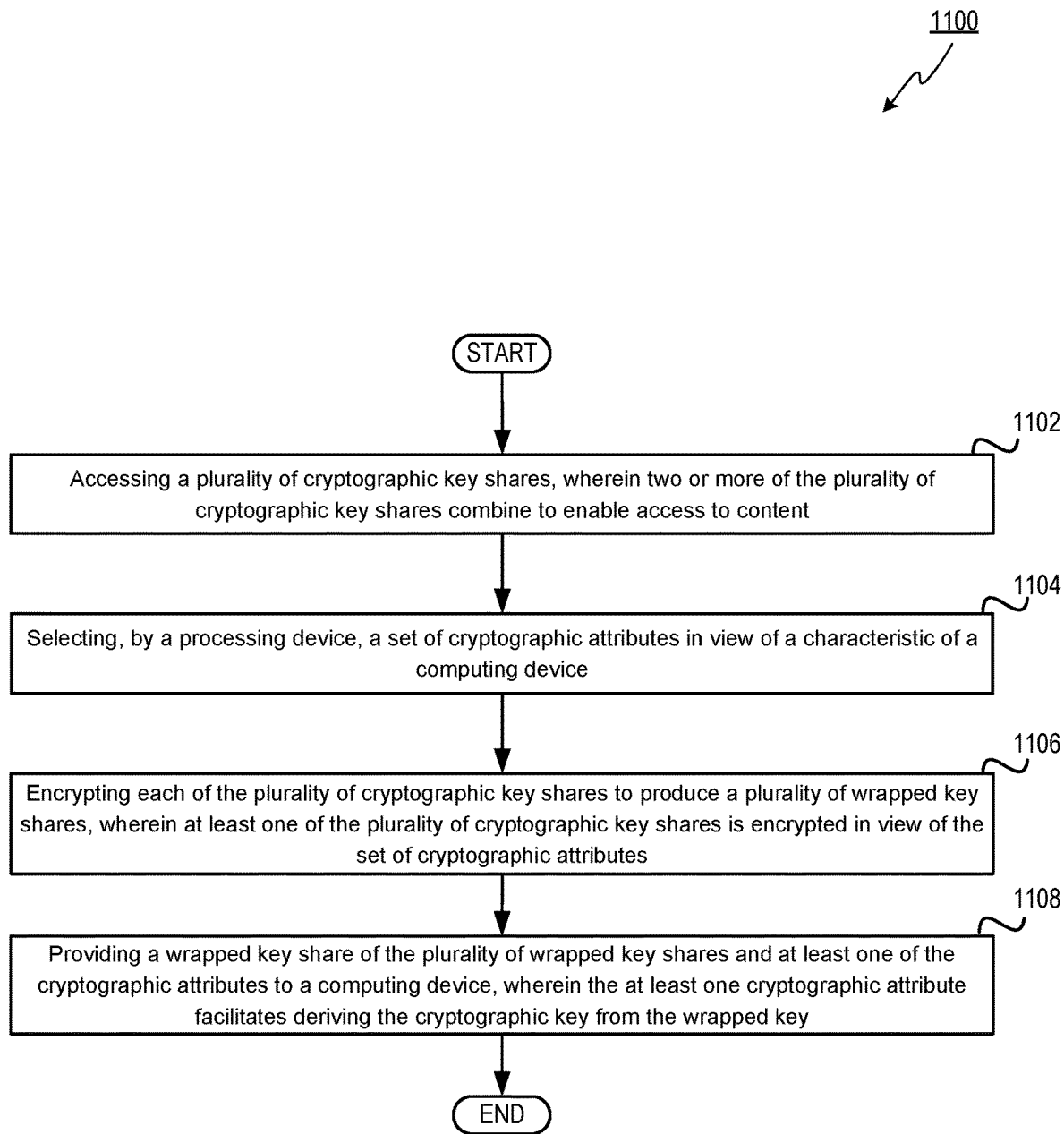
FIG. 11 depicts a flow diagram of an example method for configuring a proof-of-work key wrapping system to use key thresholding, in accordance with one or more aspects of the present disclosure.

Referring to FIG. 11, example method 1100 may be depicted as a flow diagram and involve configuring a proof-of-work key wrapping system to use key thresholding, in accordance with one or more aspects of the present disclosure. Method 1100 may be executed by one or more processing devices of a client device or server device and may begin with block 1102. At block 1102, a processing device may access a plurality of cryptographic key shares. Two or more of the plurality of cryptographic key shares may be combined to enable access to content. The plurality of cryptographic key shares may be secret shares and possession of a minimum threshold number of the secret shares enables the access to the content.

At block 1104, the processing device may select a set of cryptographic attributes in view of a characteristic of a computing device. Selecting the set of cryptographic attributes may involve predicting the characteristic of one or more computing resources of the computing device and estimating a quantity of the one or more computing resources consumed to breach a key wrapped in view of a set of candidate cryptographic attributes. The processing device may select the set of candidate cryptographic attributes in response to the estimated quantity exceeding a minimum threshold value. In one example, selecting the set of cryptographic attributes may involve selecting cryptographic attributes that enable the computing device to breach the wrapped key using a predetermined quantity of computing resources of the computing device. In another example, selecting the set of cryptographic attributes comprises selecting cryptographic attributes that enable the computing device to breach the wrapped key in a predetermined quantity of time.

At block 1106, the processing device may encrypt the plurality of cryptographic key shares to produce a plurality of wrapped key shares. The plurality of cryptographic key shares may include at least one cryptographic key share that is encrypted in view of the set of cryptographic attributes. Encrypting one of the plurality of cryptographic key shares may involve generating a wrap key in view of the set of cryptographic attributes and wrapping a cryptographic key share of the plurality of cryptographic key shares using the wrap key. In one example, the cryptographic key share may be a portion of a symmetric key to encrypt and decrypt the content and the wrap key may be a symmetric key for wrapping and unwrapping the cryptographic key share.

At block 1108, the processing device may provide one of the plurality of wrapped key shares and at least one of the cryptographic attributes to a computing device. The at least one cryptographic attribute may facilitate deriving an access key from the plurality of wrapped key shares. Providing the at least one cryptographic attribute may involve providing an indication of a key length, a key derivation function, or a salt value. The indication may reduce the computing resources consumed by a brute force attack of the wrapped key share. Responsive to completing the operations described herein above with references to block 1108, the method may terminate.

Figure 12:
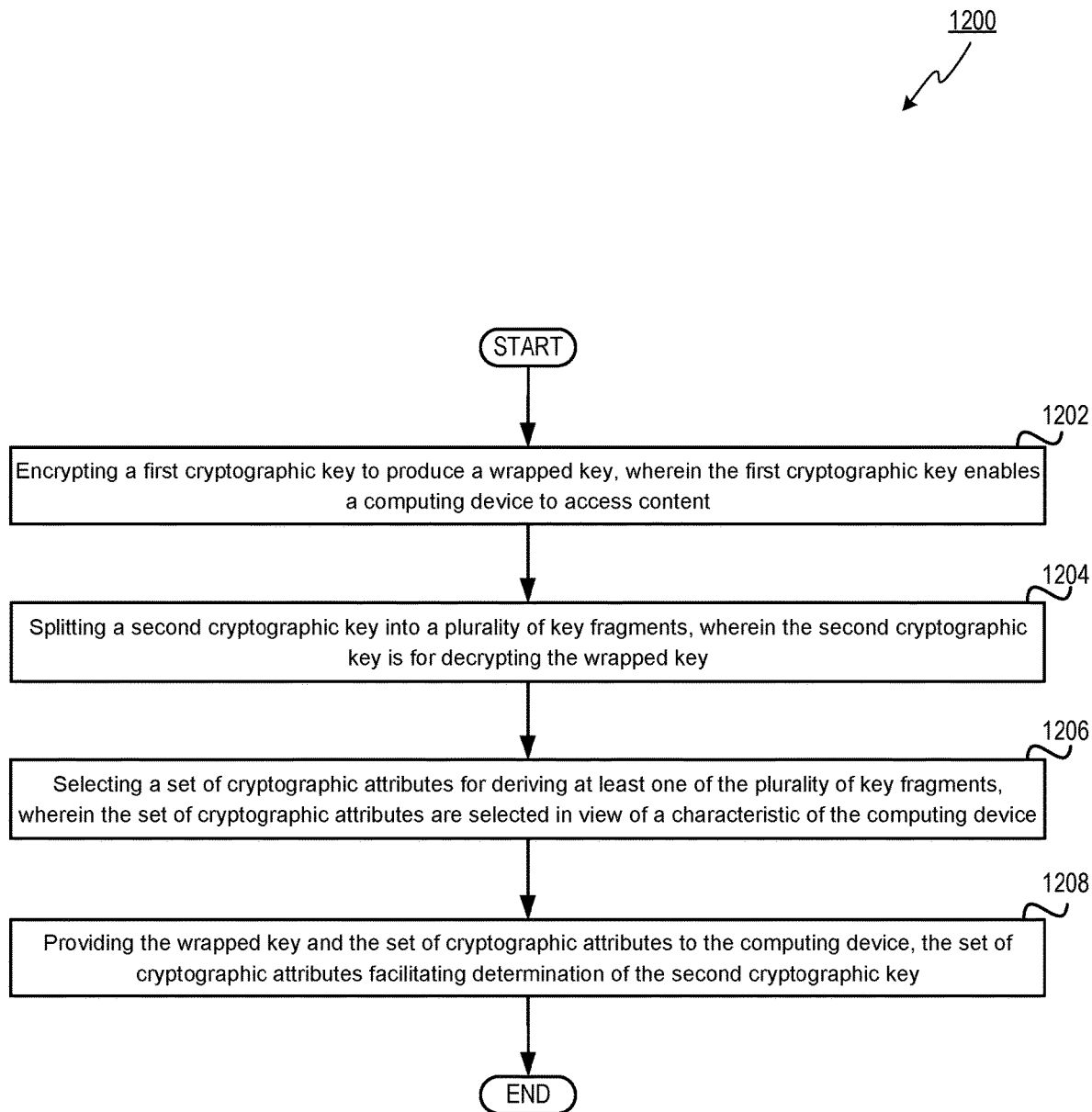
FIG. 12 depicts a flow diagram of an example method for configuring a proof-of-work key wrapping system to use multiple keys that may be derived in parallel (e.g., independent key derivation), in accordance with one or more aspects of the present disclosure.

Referring to FIG. 12, example method 1200 may be depicted as a flow diagram and involve configuring a proof-of-work key wrapping system to use multiple keys that may be derived in parallel (e.g., independent key derivation), in accordance with one or more aspects of the present disclosure. Method 1200 may be executed by one or more processing devices of a client device or server device and may begin with block 1202.

At block 1202, a processing device may encrypt a first cryptographic key to produce a wrapped key. The first cryptographic key may enable one or more computing devices to access content and may be encrypted using a second cryptographic key. In one example, the first cryptographic key may be a symmetric key to encrypt and decrypt the content and the second cryptographic key may be a symmetric key for wrapping and unwrapping the first cryptographic key.

At block 1204, the processing device may split the second cryptographic key into a plurality of key fragments. The second cryptographic key may be an unwrap key that enables the recipient computing device to decrypt the wrapped key.

At block 1206, the processing device may select a set of cryptographic attributes for deriving at least one of the plurality of key fragments. The set of cryptographic attributes may be selected in view of one or more characteristics of the computing device. The characteristic of the computing device may include data describing computing resources of the computing device. Selecting the set of cryptographic attributes may involve predicting the characteristic of one or more of the computing resources and estimating a quantity of the one or more computing resources consumed to derive the at least one key fragment in view of a set of candidate cryptographic attributes.

The processing device may select the set of candidate cryptographic attributes in response to the estimated quantity exceeding a minimum threshold value. In one example, selecting the set of cryptographic attributes may involve determining cryptographic attributes that enable the computing device to determine the at least one key fragment using a predetermined quantity of computing resources. In another example, selecting the set of cryptographic attributes comprises determining cryptographic attributes that enable the computing device to determine the at least one key fragment in a predetermined quantity of time. In either example, one or more of the encrypting and splitting may be in view of the computing resources of the computing device.

At block 1208, the processing device may provide the wrapped key and the set of cryptographic attributes to the computing device. Providing the set of cryptographic attributes may involve providing an indication of a key length, a key derivation function, or a salt value for the at least one key fragment. The set of cryptographic attributes may facilitate determination of the second cryptographic key. In one example, providing the set of cryptographic attributes to the computing device may reduce the computing resources consumed by a brute force determination of at least one key fragment. Responsive to completing the operations described herein above with references to block 1208, the method may terminate.

Figure 13:
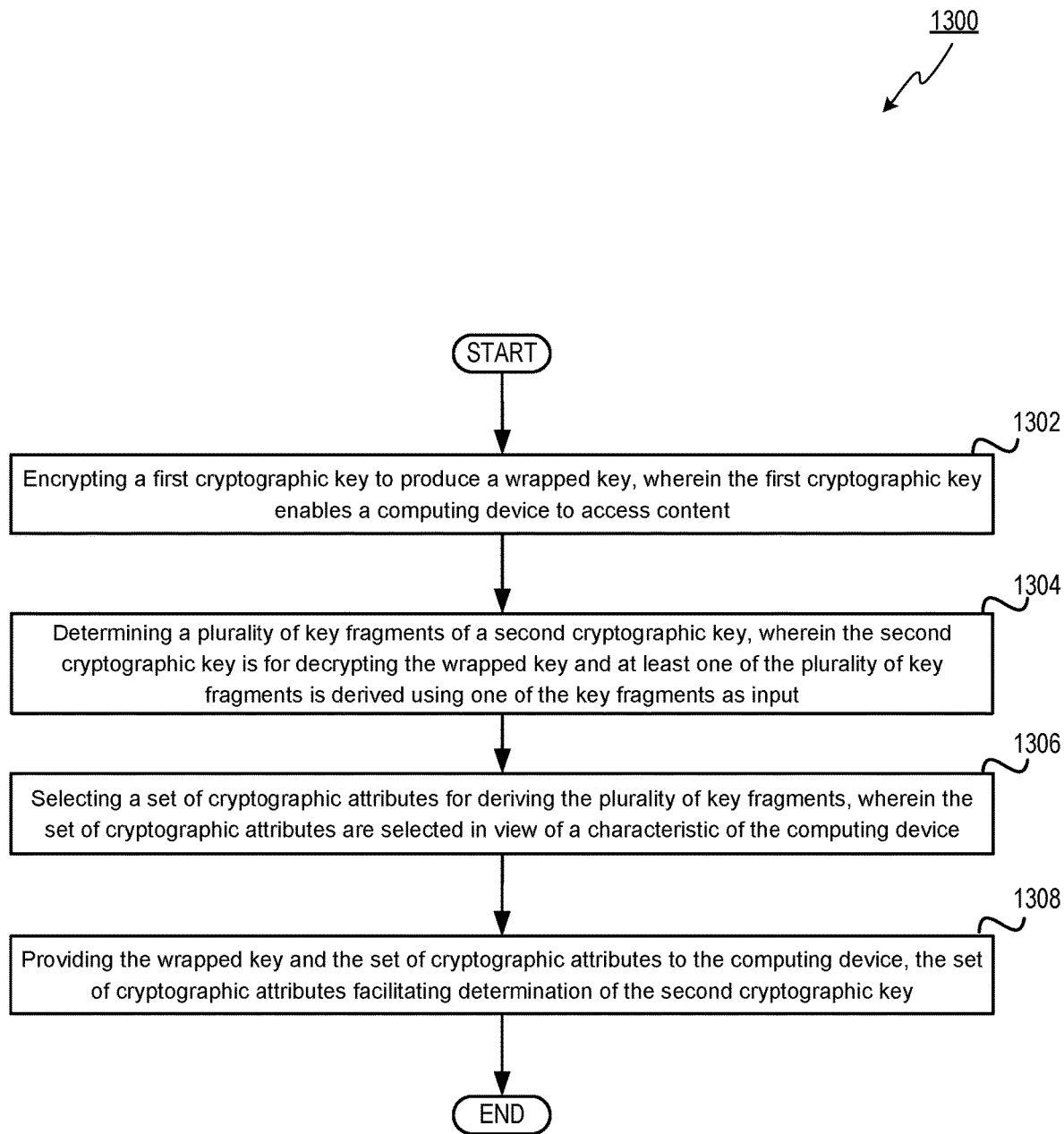
FIG. 13 depicts a flow diagram of an example method for configuring a proof-of-work key wrapping system to use multiple keys that are derived serially (e.g., integrated key derivation), in accordance with one or more aspects of the present disclosure.

Referring to FIG. 13, example method 1300 may be depicted as a flow diagram and involve configuring a proof-of-work key wrapping system to use multiple keys that are derived serially (e.g., integrated key derivation) in accordance with one or more aspects of the present disclosure. Method 1300 may be executed by one or more processing devices of a client device or server device and may begin with block 1302.

At block 1302, a processing device may encrypt a first cryptographic key to produce a wrapped key. The first cryptographic key may enable one or more computing devices to access content and may be encrypted using a second cryptographic key. The first cryptographic key may be a symmetric key to encrypt and decrypt the content and the second cryptographic key may be a symmetric key for wrapping and unwrapping the first cryptographic key.

At block 1304, the processing device may determine a plurality of key fragments of a second cryptographic key. The second cryptographic key may be for decrypting the wrapped key and at least one of the plurality of key fragments may be derived using one of the key fragments as input (e.g., integrated key fragments, mathematically related key fragments). Determining the plurality of key fragments may involve determining (e.g., obtaining, receiving, creating) the second cryptographic key for unwrapping the wrapped key and splitting the second cryptographic key into the plurality of key fragments.

At block 1306, the processing device may select a set of cryptographic attributes for deriving the plurality of key fragments. The set of cryptographic attributes may be selected in view of a characteristic of the computing device. The characteristic of the computing device may include data describing computing resources of the computing device and the encrypting and/or determining may be performed in view of the data describing the computing resources of the computing device. Selecting the set of cryptographic attributes may involve predicting the characteristics and estimating a quantity of the one or more computing resources consumed to derive the at least one key fragment in view of a set of candidate cryptographic attributes. The processing device may select the set of candidate cryptographic attributes in response to the estimated quantity exceeding a minimum threshold value. In one example, selecting the set of cryptographic attributes comprises determining cryptographic attributes that enable the computing device to determine the at least one key fragment using a predetermined quantity of computing resources. In another example, selecting the set of cryptographic attributes comprises determining cryptographic attributes that enable the computing device to determine the at least one key fragment in a predetermined quantity of time.

At block 1308, the processing device may provide the wrapped key and the set of cryptographic attributes to the computing device. The set of cryptographic attributes may facilitate determination of the wrap key. Providing the set of cryptographic attributes may involve providing an indication of a key length, a key derivation function, or a salt value for the at least one key fragment and may reduce computing resources consumed by a brute force determination of the at least one key fragment. Responsive to completing the operations described herein above with references to block 1308, the method may terminate.

Figure 14:
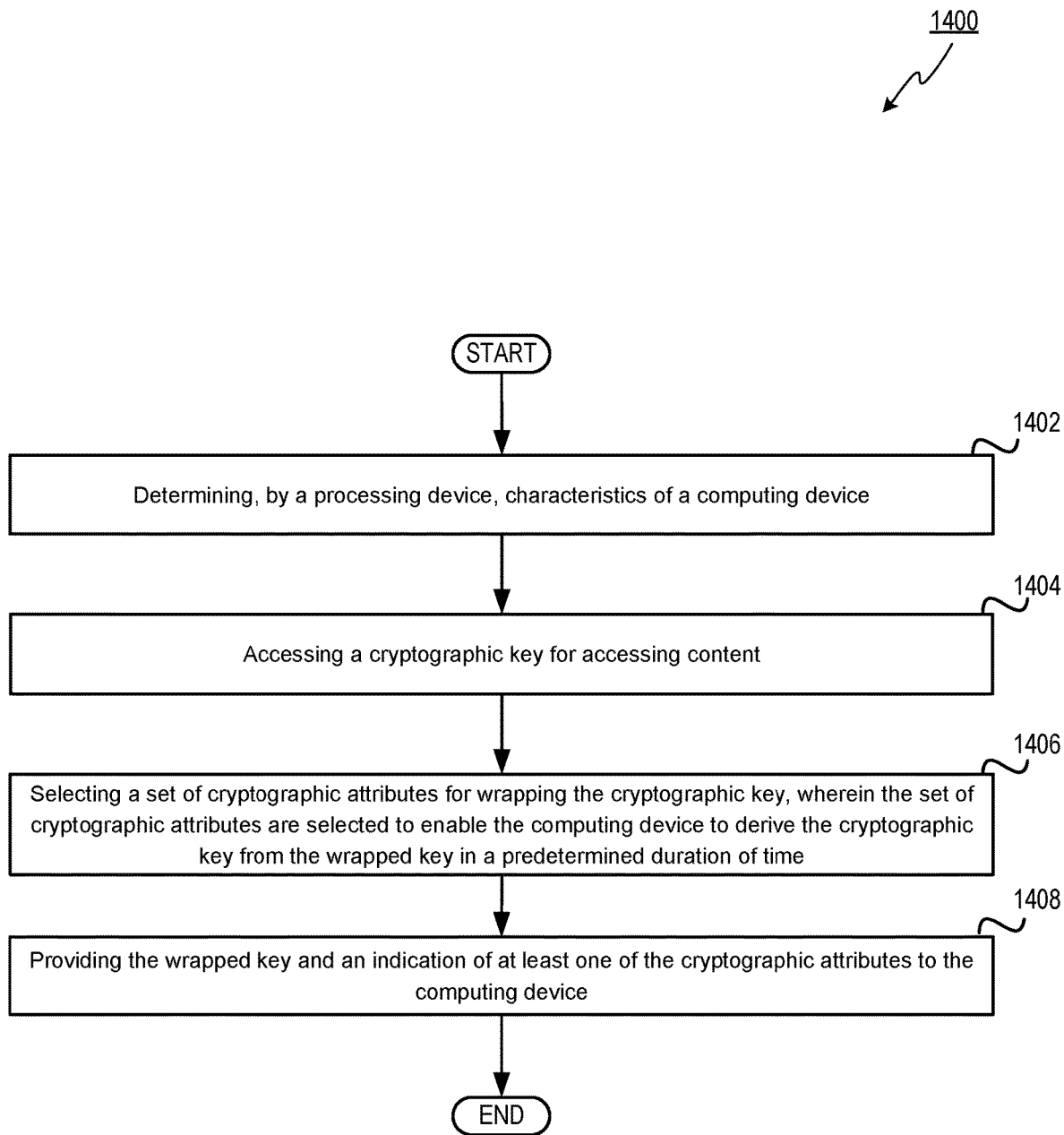
FIG. 14 depicts a flow diagram of an example method for temporally restricting access to data using a proof-of-work key wrapping system, in accordance with one or more aspects of the present disclosure.

Referring to FIG. 14, example method 1400 may be depicted as a flow diagram and involve temporally restricting access to data using a proof-of-work key wrapping system, in accordance with one or more aspects of the present disclosure. Method 1400 may be executed by one or more processing devices of a client device or server device and may begin with block 1402.

At block 1402, a processing device may determine characteristics of a computing device. This may involve predicting (e.g., estimating, approximating) the characteristics of one or more computing resources of the computing device.

At block 1404, the processing device may access a cryptographic key for accessing content. The content may enable a transaction for a smart contract and the wrapped cryptographic key may be provided to an entity associated with the smart contract.

At block 1406, the processing device may select a set of cryptographic attributes for wrapping the cryptographic key. Selecting the set of cryptographic attributes may involve estimating a quantity of the one or more computing resources consumed to breach a key wrapped in view of a set of candidate cryptographic attributes and selecting the set of candidate cryptographic attributes in response to the estimated quantity exceeding a minimum threshold value. In one example, at least one of the cryptographic attributes may include a key length of a key used to wrap the wrapped key and wherein the set of cryptographic attributes comprises the key length and a key derivation function.

The set of cryptographic attributes may be selected to enable the computing device to derive the cryptographic key from the wrapped key in a predetermined duration of time. The predetermined duration of time may exceed a time restriction of the confidential data (e.g., exceed a minimum delay necessary the confidential data). Deriving the cryptographic key from the wrapped key may involve generating and verifying a plurality of candidate cryptographic keys for unwrapping the wrapped key in view of the at least one of the cryptographic attributes.

At block 1408, the processing device may provide the wrapped key and an indication of at least one of the cryptographic attributes to the computing device. Providing the wrapped key and the indication may involve providing a package comprising the wrapped key, the cryptographic attributes, and an encrypted version of the content to the computing device. Responsive to completing the operations described herein above with references to block 1408, the method may terminate.

Figure 15:
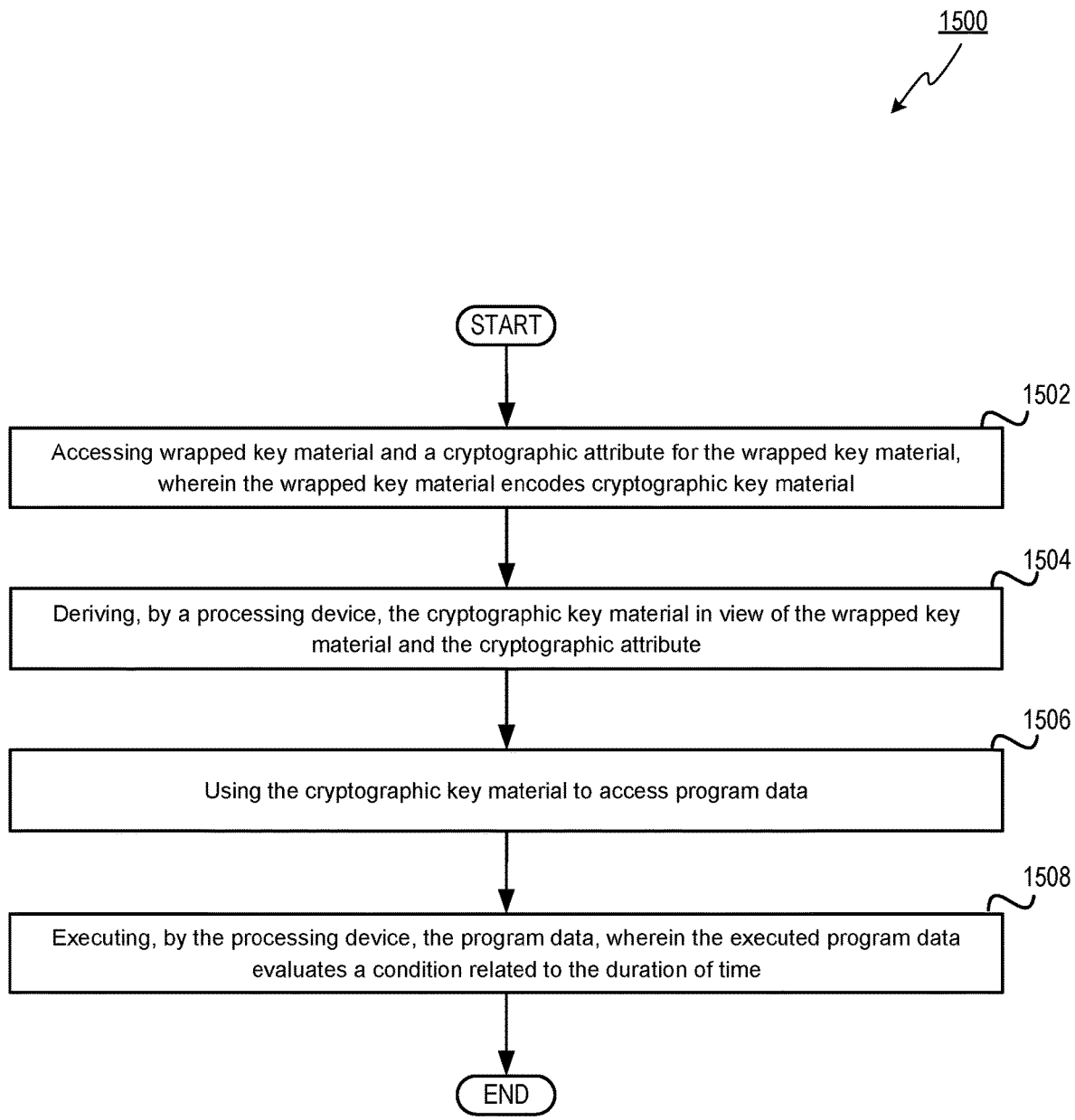
FIG. 15 depicts a block diagram of an example computer system in accordance with one or more aspects of the present disclosure.

Referring to FIG. 15, example method 1500 may be depicted as a flow diagram and involve using a proof-of-work key wrapping system to restrict data execution based on device capabilities, in accordance with one or more aspects of the present disclosure. Method 1500 may be executed by one or more processing devices of a client device or server device and may begin with block 1502. At block 1502, a processing device may access wrapped key material and a cryptographic attribute for the wrapped key material. The wrapped key material may encode cryptographic key material and the cryptographic attribute may indicate a cryptographic attribute of a cryptographic key material used to generate the wrapped key material. In one example, the cryptographic attribute may include one or more of a key length, a key derivation function, or a salt value.

At block 1504, the processing device may derive the cryptographic key material in view of the wrapped key material and the cryptographic attribute. Deriving the cryptographic key material may involve deriving the cryptographic key material from the wrapped key material without being provided a key to unwrap the wrapped key material. The deriving of the cryptographic key material may involve generating and verifying a plurality of candidate cryptographic keys for unwrapping the wrapped key material in view of the cryptographic attribute.

At block 1506, the processing device may use the cryptographic key material to access program data. The program data may include executable data of at least one of a computer program, a virtual machine image, or a container image. In one example, the program data may be accessible over a connection and using the cryptographic key material to access the program data may involve establishing the connection using the cryptographic key material. In another example, the program data may be encrypted and using the cryptographic key material to access the program data may involve decrypting the program data in view of the cryptographic key material. The encrypted version of the program data and the wrapped key material may or may not be packaged together.

At block 1508, the processing device may execute the program data. The executed program data may evaluate one or more conditions related to the duration of time of the derivation. The duration of time for deriving the cryptographic key material may or may not satisfy a predetermined minimum threshold value, which may correspond directly to a speed of the computing resources. The executing program data may perform an action in response to determining the duration of time does not satisfy a predetermined minimum threshold value. The action may involve one or more of terminating the execution of the program data, providing a signal to an entity hosting the program data, or providing a signal to an entity providing the program data. Responsive to completing the operations described herein above with references to block 1508, the method may terminate.

Figure 16:
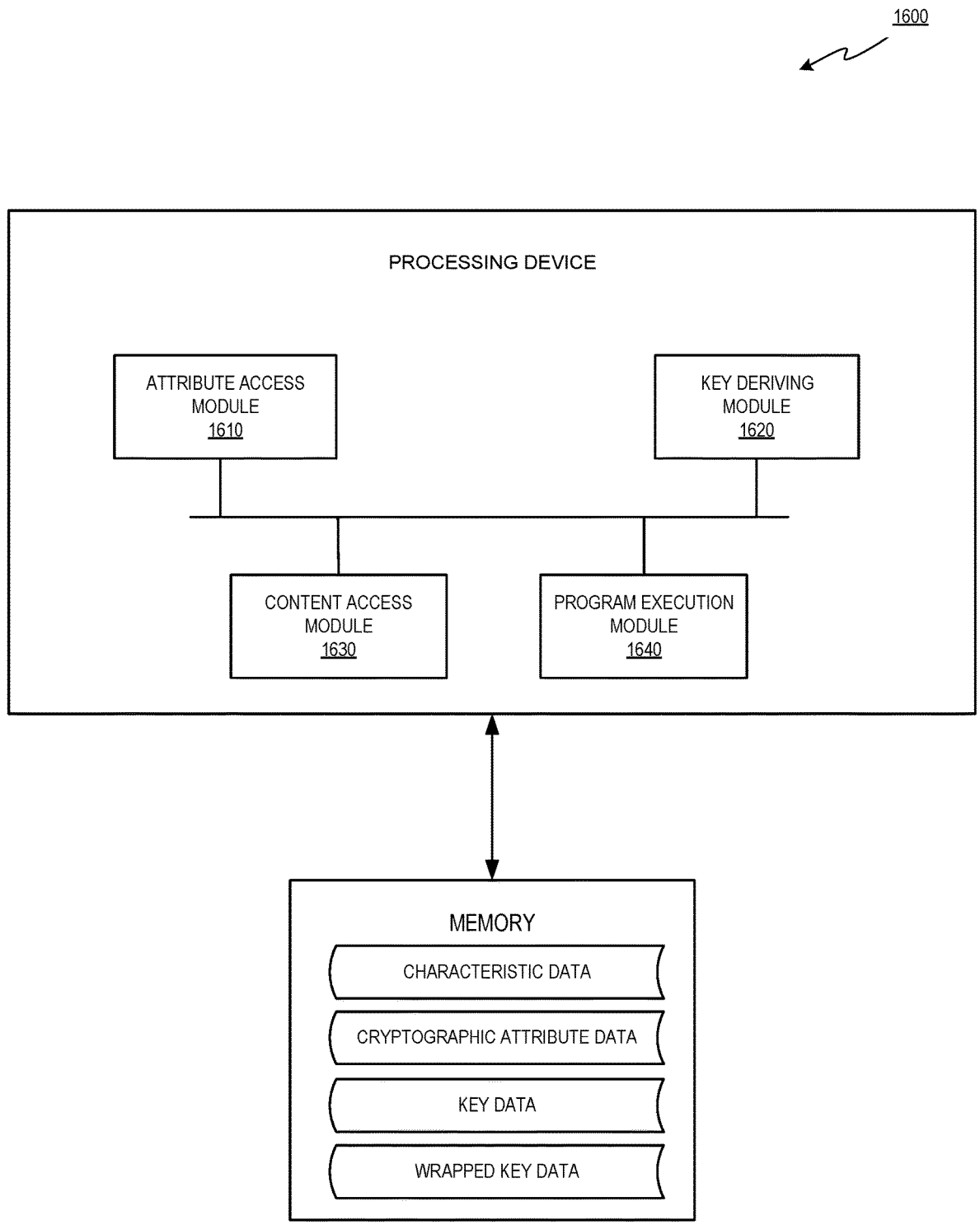
FIG. 16 depicts a flow diagram of another example method for controlling access to content using a proof-of-work key wrapping system, in accordance with one or more aspects of the present disclosure.

FIG. 16 depicts a block diagram of a computer system 1600 operating in accordance with one or more aspects of the present disclosure. Computer system 1600 may be the same or similar to computing device 110A of FIG. 2 or computing device 110B of FIG. 3, and may include one or more processing devices and one or more memory devices. In the example shown, computer system 1600 may include an attribute accessing module 1610, a key deriving module 1620, a content access module 1630, and a program execution module 1640.

Attribute accessing module 1610 may enable the processing device to access a wrapped key and a cryptographic attribute for the wrapped key. The wrapped key may encode a cryptographic key and the cryptographic attribute may indicate a cryptographic attribute of a cryptographic key used to generate the wrapped key. In one example, the cryptographic attribute may include one or more of a key length, a key derivation function, or a salt value.

Key deriving module 1620 may enable the processing device to derive the cryptographic key in view of the wrapped key and the cryptographic attribute. Deriving the cryptographic key may involve deriving the cryptographic key from the wrapped key without being provided a key to unwrap the wrapped key. The deriving of the cryptographic key may involve generating and verifying a plurality of candidate cryptographic keys for unwrapping the wrapped key in view of the cryptographic attribute.

Content access module 1630 may enable the processing device to use the cryptographic key to access program data. The program data may include executable data of at least one of a computer program, a virtual machine image, or a container image. In one example, the program data may be accessible over a connection and using the cryptographic key to access the program data may involve establishing the connection using the cryptographic key. In another example, the program data may be encrypted and using the cryptographic key to access the program data may involve decrypting the program data in view of the cryptographic key. The encrypted version of the program data and the wrapped key may or may not be packaged together.

Program execution module 1640 may enable the processing device to execute the program data. The executed program data may evaluate one or more conditions related to the duration of time of the derivation. The duration of time for deriving the cryptographic key may or may not satisfy a predetermined minimum threshold value which may correspond directly to a speed of the computing resources. The executing program data may perform an action in response to determining the duration of time does not satisfy a predetermined minimum threshold value. The action may involve one or more of terminating the execution of the program data, providing a signal to an entity hosting the program data, or providing a signal to an entity providing the program data.

Figure 17:
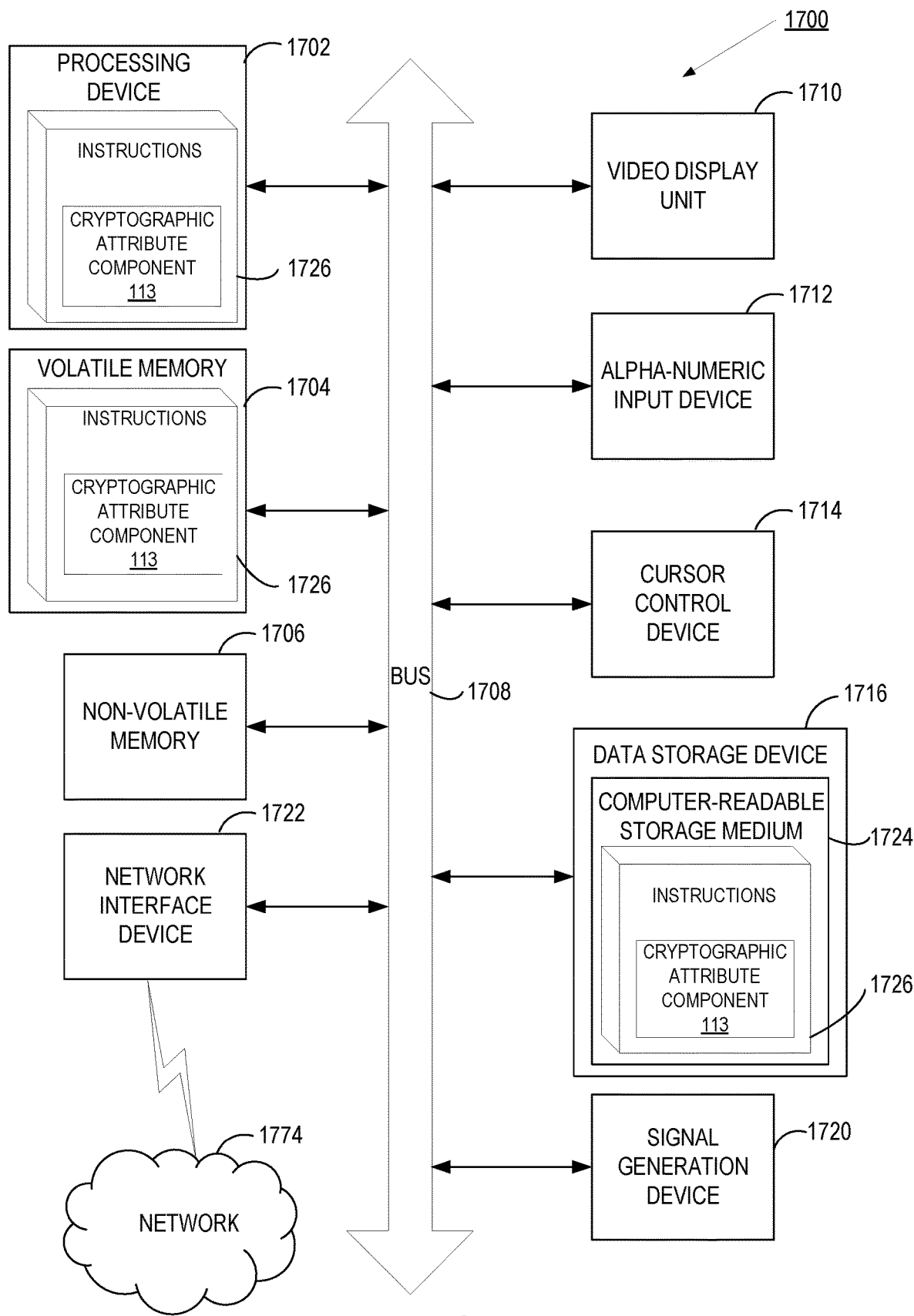
FIG. 17 depicts a block diagram of an illustrative computing device operating in accordance with the examples of the present disclosure.

FIG. 17 depicts a block diagram of a computer system operating in accordance with one or more aspects of the present disclosure. In various illustrative examples, computer system 1700 may correspond to computing device 110A-Z of FIG. 1, computing device 110A of FIG. 2, or computing device 110B of FIG. 3. Computer system 1700 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical environment, but requests for a hard disk or memory may be managed by a virtualization layer of a computing device to translate these requests to the underlying physical computing hardware resources. This type of virtualization results in multiple VMs sharing physical resources.

In certain implementations, computer system 1700 may be connected (e.g., via a network, such as a Local Area Network (LAN), an intranet, an extranet, or the Internet) to other computer systems. Computer system 1700 may operate in the capacity of a server or a client computer in a client-server environment, or as a peer computer in a peer-to-peer or distributed network environment. Computer system 1700 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 1700 may include a processing device 1702, a volatile memory 1704 (e.g., random access memory (RAM)), a non-volatile memory 1706 (e.g., read-only memory (ROM) or electrically-erasable programmable ROM (EEPROM)), and a data storage device 1716, which may communicate with each other via a bus 1708.

Processing device 1702 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 1700 may further include a network interface device 1722. Computer system 1700 also may include a video display unit 1710 (e.g., an LCD), an alphanumeric input device 1712 (e.g., a keyboard), a cursor control device 1714 (e.g., a mouse), and a signal generation device 1720.

Data storage device 1716 may include a non-transitory computer-readable storage medium 1724 on which may store instructions 1726 encoding any one or more of the methods or functions described herein, including instructions for implementing method 300 and for encoding components 132, 134, and 136 of FIGS. 1-2.

Instructions 1726 may also reside, completely or partially, within volatile memory 1704 and/or within processing device 1702 during execution thereof by computer system 1700, hence, volatile memory 1704 and processing device 1702 may also constitute machine-readable storage media.

While computer-readable storage medium 1724 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "deriving," "encrypting," "creating," "generating," "using," "accessing," "executing," "obtaining," "storing," "transmitting," "providing," "establishing," "receiving," "identifying," "initiating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   accessing, by a computing device, a wrapped key and an encrypted version of program data, wherein the wrapped key encodes a cryptographic key;
   deriving, by the computing device, the cryptographic key in view of the wrapped key and a cryptographic attribute for the wrapped key, wherein the deriving is a proof-of-work task that consumes computing resources of the computing device for a duration of time;
   using the derived cryptographic key to decrypt the encrypted version of the program data, wherein the program data comprises a condition checking function; and
   executing, by the computing device, the program data and the condition checking function, wherein the condition checking function of the program data evaluates the duration of time to determine whether to continue executing the program data.

2. The method of claim 1, wherein the executing program data performs an action in response to determining the duration of time does not satisfy a predetermined minimum threshold value, wherein the action comprises terminating the execution of the program data, providing a signal to an entity hosting the program data, or providing a signal to an entity providing the program data.

3. The method of claim 1, wherein the cryptographic attribute comprises a cryptographic attribute of a cryptographic key used to generate the wrapped key, wherein the cryptographic attribute comprises one or more of a key length, a key derivation function, or a salt value.

4. The method of claim 1, wherein deriving the cryptographic key comprises performing a brute force attack to discover a candidate cryptographic key for unwrapping the wrapped key, and wherein the cryptographic attribute comprises a hint to reduce an amount of the computing resources consumed by the brute force attack.

5. The method of claim 1, wherein the computing device is a cloud computing device and the program data comprises a virtual machine image or a container image that uses the duration of time of the proof-of-work task to verify that a set of characteristics of the computing device satisfies a predetermined minimum threshold, wherein the set of characteristics comprises at least one of processor speed, memory size, or network bandwidth.

6. The method of claim 1, wherein the wrapped key and the encrypted version of the program data are packaged together.

7. The method of claim 1, wherein the duration of time for deriving the cryptographic key satisfies a predetermined minimum threshold value and corresponds to a speed of the computing resources.

8. A system comprising:
   a memory; and
   a processing device of a computing device communicably coupled to the memory, the processing device to:
      access a wrapped key and an encrypted version of program data, wherein the wrapped key encodes a cryptographic key;
      derive the cryptographic key in view of the wrapped key and a cryptographic attribute for the wrapped key, wherein the deriving is a proof-of-work task that consumes computing resources of a computing device for a duration of time;
      use the derived cryptographic key to decrypt the encrypted version of the program data, wherein the program data comprises a condition checking function; and
      execute, by the computing device, the program data comprising the condition checking function, wherein the condition checking function of the program data evaluates the duration of time to determine whether to continue executing the program data.

9. The system of claim 8, wherein the processing device executing the program data performs an action in response to determining the duration of time does not satisfy a predetermined minimum threshold value, wherein the action comprises terminating the execution of the program data, providing a signal to an entity hosting the program data, or providing a signal to an entity providing the program data.

10. The system of claim 8, wherein the cryptographic attribute comprises a cryptographic attribute of a cryptographic key used to generate the wrapped key, wherein the cryptographic attribute comprises one or more of a key length, a key derivation function, or a salt value.

11. The system of claim 8, wherein to derive the cryptographic key, the processing device is to perform a brute force attack to discover a candidate cryptographic key for unwrapping the wrapped key, and wherein the cryptographic attribute comprises a hint to reduce an amount of the computing resources consumed by the brute force attack.

12. The system of claim 8, wherein the program data comprises executable data of at least one of a computer program, a virtual machine image, or a container image.

13. The system of claim 8, wherein the wrapped key and an encrypted version of the program data are packaged together.

14. The system of claim 8, wherein the duration of time for deriving the cryptographic key satisfies a predetermined minimum threshold value and corresponds to a speed of the computing resources.

15. A non-transitory machine-readable storage medium storing instructions which, when executed, cause a processing device of a computing device to perform operations comprising:
  accessing wrapped key material and an encrypted version of program data, wherein the wrapped key material encodes cryptographic key material;
  deriving the cryptographic key material in view of the wrapped key material and a cryptographic attribute for the wrapped key material, wherein the deriving is a proof-of-work task that consumes computing resources of the computing device for a duration of time;
  using the derived cryptographic key material to decrypt the encrypted version of the program data, wherein the program data comprises a condition checking function; and
  executing the program data and the condition checking function, wherein the condition checking function of the program data evaluates the duration of time to determine whether to continue executing the program data.

16. The non-transitory machine-readable storage medium of claim 15, wherein the executing program data performs an action in response to determining the duration of time does not satisfy a predetermined minimum threshold value, wherein the action comprises terminating the execution of the program data, providing a signal to an entity hosting the program data, or providing a signal to an entity providing the program data.

17. The non-transitory machine-readable storage medium of claim 15, wherein the cryptographic attribute comprises a cryptographic attribute of a cryptographic key used to wrap the cryptographic key material, wherein the cryptographic attribute comprises one or more of a key length, a key derivation function, or a salt value.

18. The non-transitory machine-readable storage medium of claim 15, wherein deriving the cryptographic key material comprises generating a plurality of candidate cryptographic keys for unwrapping the wrapped key material.

* * * * *